United States Patent
Galindo Gonzalez

(10) Patent No.: US 12,294,204 B2
(45) Date of Patent: May 6, 2025

(54) ARMORED CABLE STRIPPING TOOL FOR CUTTING THE ARMOR IN TWO PLACES

(71) Applicant: Southwire Company, LLC, Carrollton, GA (US)

(72) Inventor: Juan Alberto Galindo Gonzalez, Powder Springs, GA (US)

(73) Assignee: Southwire Company, LLC, Carrollton, GA (US)

( * ) Notice: Subject to any disclaimer, the term of this patent is extended or adjusted under 35 U.S.C. 154(b) by 0 days.

(21) Appl. No.: 16/881,428

(22) Filed: May 22, 2020

(65) Prior Publication Data

US 2020/0373745 A1    Nov. 26, 2020

Related U.S. Application Data

(60) Provisional application No. 62/852,047, filed on May 23, 2019.

(51) Int. Cl.
*H02G 1/12* (2006.01)
*H02G 1/00* (2006.01)

(52) U.S. Cl.
CPC ......... *H02G 1/1217* (2013.01); *H02G 1/1239* (2013.01); *H02G 1/1297* (2013.01); *H02G 1/005* (2013.01)

(58) Field of Classification Search
CPC .. H02G 1/1217; H02G 1/1239; H02G 1/1297; H02G 1/005; H02G 1/1202; H02G 1/126; H02G 15/005; H02G 2015/0021; B26D 1/24; B26D 3/001; H01B 7/36; B21B 1/8015; B21B 2015/0021
See application file for complete search history.

(56) References Cited

U.S. PATENT DOCUMENTS

| | | |
|---|---|---|
| 435,414 A | 9/1890 | Fisher |
| 1,866,095 A | 7/1932 | Foley |
| 2,031,470 A | 2/1936 | Eck et al. |
| 2,346,227 A | 4/1944 | Martin et al. |
| 2,391,722 A | 12/1945 | Lundeen |
| 2,396,442 A | 3/1946 | Shaver et al. |
| 2,559,387 A | 7/1951 | Baker |
| 2,648,899 A | 8/1953 | Beyer |
| 2,654,941 A | 10/1953 | Schleimer |

(Continued)

FOREIGN PATENT DOCUMENTS

| | | | |
|---|---|---|---|
| DE | 3541566 A1 * | 6/1986 | ........... H01B 15/005 |
| FR | 1075657 | 10/1954 | |
| GB | 225280 A * | 11/1924 | ........... H01B 15/006 |

OTHER PUBLICATIONS

U.S. Office Action dated Feb. 26, 2020 cited in U.S. Appl. No. 16/269,123, 23 pages.

(Continued)

*Primary Examiner* — Liang Dong
(74) *Attorney, Agent, or Firm* — Merchant & Gould P.C.

(57) ABSTRACT

A stripping tool for cutting the armor sheathing of a cable. The stripping tool includes a cable receiving handle and a saw handle movably mounted to the cable receiving handle. A saw assembly, including at least one saw blade, is supported by the saw handle and moveable relative to the cable receiving handle. The saw assembly configured to simultaneously cut the armor sheathing of the cable in two places.

10 Claims, 14 Drawing Sheets

(56) References Cited

U.S. PATENT DOCUMENTS

| | | | |
|---|---|---|---|
| 2,659,140 | A | 11/1953 | Davison |
| 2,674,027 | A | 4/1954 | Kosinski |
| 2,778,105 | A | 1/1957 | Carta |
| 2,892,475 | A | 6/1959 | Lapsley |
| 3,044,170 | A | 7/1962 | Agombar et al. |
| 3,218,709 | A | 11/1965 | Norton |
| 3,316,781 | A | 5/1967 | Bignell et al. |
| 3,371,415 | A * | 3/1968 | Hutchinson .......... B23D 45/122 30/90.3 |
| 3,453,917 | A | 7/1969 | Perry |
| 3,462,052 | A | 8/1969 | Wagner |
| 3,535,785 | A | 10/1970 | Matthews |
| 3,568,314 | A | 3/1971 | Adams |
| 3,633,275 | A | 1/1972 | Hutchinson |
| 3,665,603 | A | 5/1972 | Brilbrey et al. |
| 3,703,035 | A | 11/1972 | Handy |
| 3,826,001 | A | 7/1974 | Brilbrey et al. |
| 3,851,387 | A | 12/1974 | Ducret |
| 3,951,727 | A | 4/1976 | Greenberg |
| 4,055,097 | A | 10/1977 | Ducret |
| 4,062,110 | A | 12/1977 | Alvarex |
| 4,103,578 | A | 8/1978 | Ducret |
| 4,142,290 | A | 3/1979 | Ducret |
| 4,169,400 | A | 10/1979 | Ducret |
| 4,199,854 | A | 4/1980 | Bitting et al. |
| 4,244,102 | A | 1/1981 | Bolles |
| 4,265,016 | A | 5/1981 | Ducret |
| 4,267,636 | A | 5/1981 | Ducret |
| 4,359,819 | A | 11/1982 | Ducret |
| 4,437,237 | A | 3/1984 | Ducret |
| 4,489,490 | A | 12/1984 | Michaels et al. |
| 4,534,254 | A | 8/1985 | Budzich et al. |
| 4,674,183 | A | 6/1987 | Ducret |
| 4,697,343 | A | 10/1987 | Collins |
| 4,706,535 | A | 11/1987 | Ducharme |
| 4,753,001 | A | 6/1988 | Alexander |
| 4,753,007 | A | 6/1988 | Weller |
| 4,759,129 | A | 7/1988 | Alpha |
| 4,769,909 | A | 9/1988 | Ducret |
| 4,884,339 | A | 12/1989 | Custin |
| 4,896,909 | A | 1/1990 | Mauer |
| 4,977,671 | A | 12/1990 | Ducret |
| 4,979,307 | A | 12/1990 | Ste. Marie |
| 5,070,615 | A | 12/1991 | Michael, III |
| D323,608 | S | 2/1992 | Boese |
| 5,105,702 | A | 4/1992 | Fara |
| 5,107,735 | A | 4/1992 | Ramun et al. |
| 5,148,732 | A | 9/1992 | Striebig |
| 5,169,400 | A * | 12/1992 | Muhling ................ A61B 17/86 411/395 |
| 5,287,786 | A | 2/1994 | Fiala |
| 5,301,426 | A | 4/1994 | Regan |
| 5,337,479 | A | 8/1994 | Ducret |
| 5,487,220 | A | 1/1996 | Saitou |
| 5,542,327 | A | 8/1996 | Schultz |
| 5,724,740 | A | 3/1998 | Bishop |
| 5,809,652 | A | 9/1998 | Ducret |
| 5,822,863 | A * | 10/1998 | Ott ....................... G02B 6/4497 30/90.4 |
| 6,044,744 | A | 4/2000 | Eslambolchi et al. |
| 6,073,349 | A | 6/2000 | Liversidge |
| 6,308,417 | B1 | 10/2001 | Ducret |
| 6,311,600 | B1 | 11/2001 | Lo et al. |
| 6,662,450 | B1 | 12/2003 | Ducret |
| 7,891,097 | B2 * | 2/2011 | Hartranft ............. H02G 1/1297 30/90.3 |
| 8,074,551 | B2 | 12/2011 | Chae |
| 8,112,893 | B2 | 2/2012 | Harger |
| 8,191,266 | B2 | 6/2012 | Ducret |
| 8,443,518 | B2 | 5/2013 | Fisher |
| 8,522,440 | B2 | 9/2013 | Ducret |
| 9,088,144 | B2 | 7/2015 | Ducret |
| 9,136,677 | B2 | 9/2015 | Ducret |
| 9,153,364 | B2 | 10/2015 | Parker |
| 9,270,095 | B2 | 2/2016 | Johnston |
| D760,568 | S | 7/2016 | Plaisance, III et al. |
| 9,748,748 | B2 | 8/2017 | Ducret |
| 9,825,440 | B1 | 11/2017 | Manna |
| 10,033,167 | B1 | 7/2018 | De Vita et al. |
| 10,164,413 | B2 | 12/2018 | Ducret |
| 10,297,991 | B2 | 5/2019 | Soerensen |
| 2004/0055160 | A1 | 3/2004 | Ducret |
| 2004/0194582 | A1 | 10/2004 | Palmowski |
| 2005/0066528 | A1 | 3/2005 | Ducret |
| 2006/0021482 | A1 | 2/2006 | Ducret |
| 2006/0021483 | A1 | 2/2006 | Ducret |
| 2008/0047147 | A1 * | 2/2008 | Ducret ................. H02G 1/1297 30/90.4 |
| 2008/0282551 | A1 | 11/2008 | Stravitz |
| 2012/0167719 | A1 | 7/2012 | Newman |
| 2013/0042483 | A1 | 2/2013 | Ducret |
| 2014/0190020 | A1 | 7/2014 | Galster |
| 2014/0215830 | A1 | 8/2014 | Ducret |
| 2017/0324226 | A1 | 11/2017 | Ducret |
| 2018/0248344 | A1 | 8/2018 | Zagula |
| 2019/0097401 | A1 | 3/2019 | Ducret |
| 2019/0245332 | A1 | 8/2019 | Jackson et al. |
| 2019/0267780 | A1 | 8/2019 | Smith |

OTHER PUBLICATIONS

Amendment and Response filed on Aug. 21, 2020 to U.S. Office Action dated Feb. 26, 2020 cited in U.S. Appl. No. 16/269,123, 11 pages.

U.S. Office Action dated Sep. 28, 2020 cited in U.S. Appl. No. 16/269,123, 19 pages.

Reissue U.S. Appl. No. 15/155,782, filed May 16, 2016 entitled "Armor Clamping and Cutting Tool," 22 pages.

* cited by examiner

ARMORED CABLE STRIPPING TOOL FOR CUTTING THE ARMOR IN TWO PLACES

CROSS REFERENCE TO RELATED APPLICATION

This application is a non-provisional application which claims a benefit of priority to U.S. Provisional Application No. 62/852,047, filed May 23, 2019, the entire contents of which are herein incorporated by reference.

BACKGROUND

1. Field of the Invention

The present invention generally relates to hand tools for stripping armored cables, metal-clad cables, and flexible metal conduits, including such cables and conduits known as AC, BX, MC cable, RWA, RWS, and SWA. More specifically, the invention relates to a hand tool for temporarily clamping a metallic sheathed cable and cutting the metal sheathing without damage to the conductors therein and allowing the metal sheathing to be stripped away from the conductors. For convenience, such cables and conduits are herein collectively referred to as just armored cable.

2. Description of the Related Technology

Tools of the general variety for stripping armored cable to which the present disclosure relates are disclosed in U.S. Pat. Nos. 4,769,909; 8,191,266; and 9,088,144, the disclosures of which are herein incorporated by reference. These tools have been successful in replacing the use of hacksaws for cutting armored conduits, which is difficult since, not only is the sheathing made of a metallic or other tough material, but that the armored cable tends to want to slip relative to the cutting tool, resulting in the possibility of injury to an operator or damaging of the cable materials within the sheathing. Such tools generally hold the sheathing, preventing it from slipping relative to a cutting element, and limit the depth to which the cutting element penetrates, preventing the cutting element from contacting and damaging the cable materials within the sheathing.

SUMMARY

In overcoming the enumerated drawbacks and other limitations of the related art, the present invention, a stripping tool is provided for simultaneously cutting the armor sheathing of a cable in two places.

In one aspect of the invention, the stripping tool includes a saw assembly configured to cut the armor of a cable in first and second places.

In another aspect, the stripping tool is a hand tool.

In yet another aspect, the present invention provides a stripping tool including a cable receiving handle that defines a cable receiving channel. A saw assembly is coupled to the cable receiving handle, and the saw assembly including first and second saw blades. A drive mechanism rotatably drives the first and second saw blades. The first saw blade is located in a first position relative to the cable receiving channel, while the second saw blade is located in a second position relative to the cable receiving channel. When driven by the drive mechanism, the first and second saw blades are configured to cut the armor of a cable located in the cable receiving channel in first and second locations.

In a further aspect, the first position is different than the second position.

In an additional aspect, the first position is opposed to the second position.

In yet another aspect, the first position is diametrically opposed to the second position.

In still a further aspect, the drive mechanism includes a series of gears coupled to the first and second saw blades.

In another aspect, the drive mechanism include a manually rotatable crank arm.

In an additional aspect, the drive mechanism includes a motor.

In another aspect, the motor is a direct current motor.

In a further aspect, a first saw handle and a second saw handle, each of the first and second saw handles being pivotally mounted to the cable receiving handle.

In additional aspect, the first and second saw handles are mounted to a common end of the cable receiving handle.

In still another aspect, the first and second saw handles are opposed to one another.

In yet another aspect, the first saw blade is supported by the first saw handle and the second saw blade is supported by the second saw handle.

In a further aspect, comprising a cable stop located within the cable receiving channel, the cable stop delimiting an available length of the cable receiving channel for receiving the cable.

In yet a further aspect, the cable stop is moveably mounted within the cable receiving channel and moveable between a plurality of stop positions, each of the stop positions delimiting a different available length of the cable receiving channel for receiving the cable.

In another aspect, the cable stop includes a biasing member and a stop block, the biasing member biasing the stop block along the cable receiving channel.

In an additional aspect, comprising a depth adjustment mechanism, the depth adjustment mechanism including a stop member selectively movable between a plurality of interfering positions, the interfering positions each defining a penetration depth of the first and second saw blades into the armor of the cable.

In further aspect, the depth adjustment mechanism includes two stop members, the two stop members being synchronously coupled together and movable between the plurality of interfering positions.

In another aspect, the depth adjustment mechanism further includes a single rotatable input member coupled to the two stop members.

Further objects, features and advantages of this invention will become readily apparent to persons skilled in the art after review of the following description, including the claim, with reference to the drawings that are appended to and form a part of this specification.

DETAILED DESCRIPTION OF THE PREFERRED EMBODIMENTS

Figure 1:
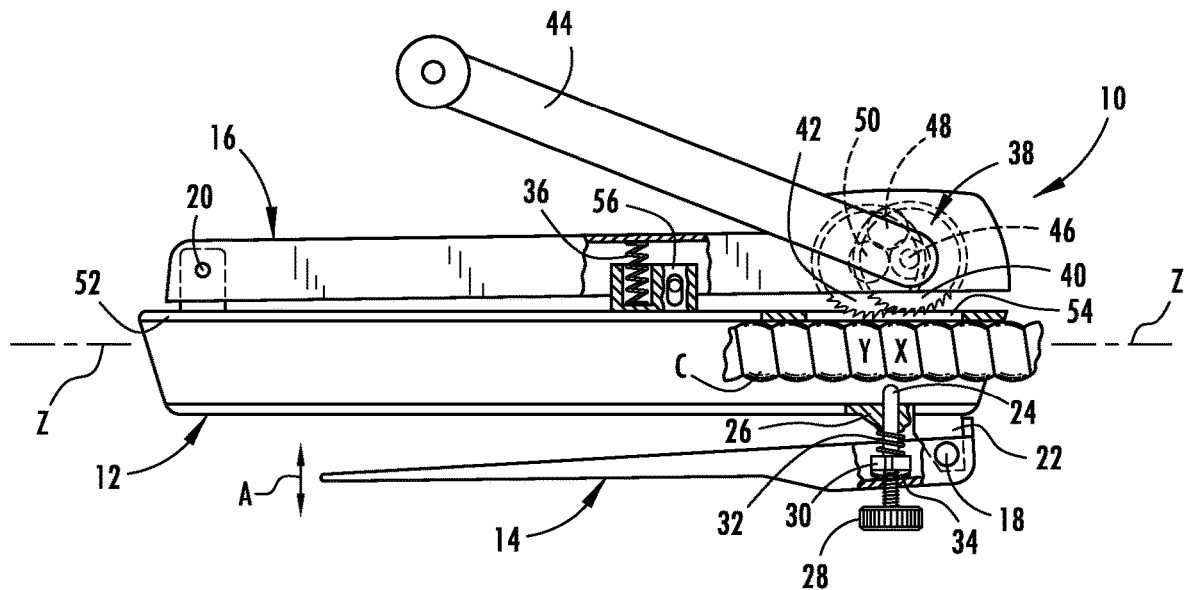
FIG. 1 is a side view, with portion broken away, of a first variation of a hand tool embodying the principles of the present invention and shown with a length of armored cable extended through the cutting zone of the hand tool.

Referring now to FIG. 1, indicated generally at 10 is a hand tool embodying the principles of the present invention. The hand tool 10 includes as its principle components a cable receiving handle 12, a cable clamping lever 14 and a saw handle 16.

Figure 2:
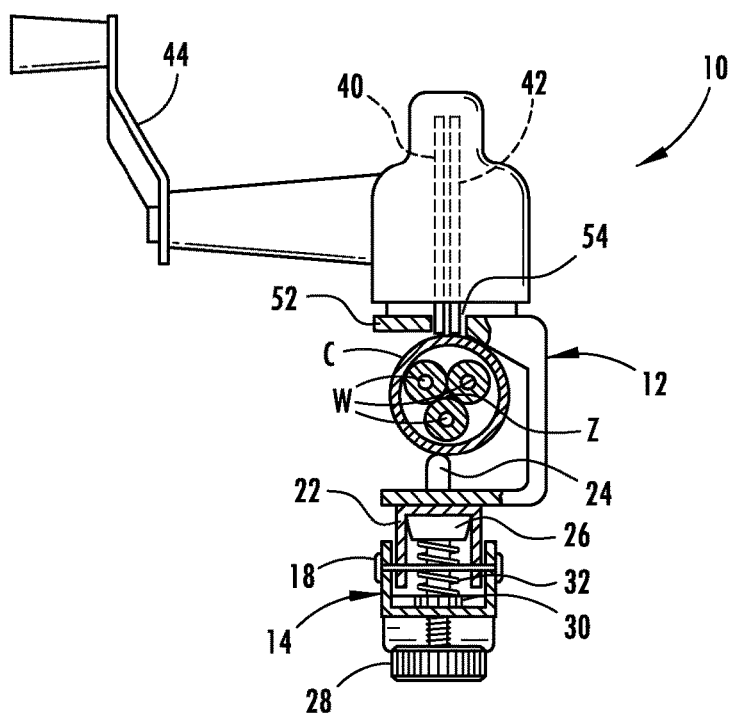
FIG. 2 is a cross-sectional view of the hand tool generally taken along line 2-2 in FIG. 1.

The cable clamping lever 14 is hingedly connected to one end of the cable receiving handle 12 by means of a front pivot 18, while the saw handle 16 is hingedly connected to the other end of the cable receiving handle 12 by means of a rear pivot 20. As is seen in FIGS. 1 and 2, the cable receiving handle 12 is C-shaped, preferably, in cross-section with the C-shape opening to a lateral side of the hand tool 10. With this shape, the cable receiving handle 12 defines a channel 21 for receiving a cable "C."

The cable clamping lever 14 is preferably U-shaped, at least at the end containing the front pivot 18, and has an internal dimension that is sized to receive a pivot block 22 that extends from a corresponding end of the cable receiving handle 12. The cable clamping lever 14 fits over the pivot block 22 and pivot 18, which may be a pin, passes through both the cable clamping lever 14 and the pivot block 22 providing the hinged connection between the cable clamping lever 14 and the cable receiving handle 12.

As indicated by arrow "A," the rotation about pivot 18 allows a limited degree of upward and downward motion of the clamping lever 14. This motion is limited in one direction by the cable receiving handle 12 and in the opposite direction by contact between one end of the cable clamping lever 14 and a stop 23 formed as part of the pivot block 22.

Supported by the clamping lever 14 is a clamping stud 24. The clamping stud 24 includes one end that freely slides within a journal 26 that is formed in a lower wall 25 of the cable receiving handle 12. The opposing end of the clamping stud 24 is threaded and projects through an opening in the clamping lever 14. Provided on the threaded end of the clamping stud 24, outward of the clamping lever 14, is an adjustment knob 28. The adjustment knob 28 is securely fastened to the clamping stud 24 by means of an adhesive, set screw, lock nut or any other suitable means.

A stop nut 30 is adjustably moveable along the length of the threaded portion of the clamping stud 24 and is located between the clamping lever 14 and the cable receiving handle 12. The external dimensions of stop nut 30 match the internal dimension of the clamping lever 14, thus preventing rotation of the stop nut 30. By rotating the adjustment knob 28, the clamping stud 24 is rotated and the stop nut 30 is caused to move along and relative to the threaded portion of the stud 24. Thus, the position of the stop nut 30 along the clamping stud 24 determines the extent to which the clamping stud 24 projects into the channel of the cable receiving handle 12, both initially and when the clamping lever 14 is squeezed toward the cable receiving handle 12.

A biasing means, such as a spring 32, presses outward between one side of the stop nut 30 and the periphery of the journal 26. The spring 32 therefore serves to bias the clamping lever 14 to an unclamped position.

In use, the clamping mechanism functions in the following manner. The spring 32 presses between one side of the stop nut 30 and the cable receiving handle 12 so as to bias the clamping handle 14 to the unclamped position. In the unclamped position the clamping stud 24 is retracted sufficiently to permit the cable C to be inserted or removed from the cable receiving handle 12. A cable to be cut is inserted into the channel 21 of the cable receiving handle 12 and adjustment knob 28 is rotated to bring the clamping stud 24 into position near the cable "C." When the handle 12 and lever 14 are forced together, the clamping lever 14 presses against the stop nut 30, which forces the clamping stud 24 into clamping contact with the sheathing/armor of the cable C. Upon release of the clamping pressure, the spring 32 returns the clamping lever 14 to the unclamped position, ready for removal of the cable C from the channel 28 of the cable receiving handle 12.

If desired, another resilient means 34, such as a bowed spring washer, may be located between the stop nut 30 and the clamping lever 14. The resiliency of spring washer 34 prevents overstressing of the mechanical components that may occur when excess pressures are applied during the cutting operation.

As noted above, the clamping mechanism of the clamping lever 14 and cable receiving handle 12 are integrated with a saw. By clamping the cable C with the clamping mechanism, the cable C is securely held relative to the saw thereby allowing the armor to be cut without risk of injury to the operator or damage to the cable inside the armor.

In the preferred embodiment, the saw handle 16 pivots on the pivot 20 and a spring 36, located between the saw handle 16 and the cable receiving handle 12, biases the saw handle 16 to a non-cutting position spaced away from the cable receiving handle 12.

Provided in and supported by the saw handle 16, generally at the end opposite of the pivot 20, is a saw assembly 38. Generally, the saw assembly 38 includes at least one saw blade and a mechanism for rotating or driving the saw blade. As provided in FIG. 1, the saw assembly 38 includes two circular saw blades 40, 42 rotated by a crank handle 44 and inter-disposed gears 46, 48, 50. Preferably, gear 46 is coaxial with the front saw blade 40 and gear 50 is coaxial with the rear saw blade 42. The gear 48 is disposed between the two gears 46, 50 so as to be driven by gear 46 and drive gear 50 (or vice versa), thereby allowing the crank handle 44 to simultaneously drive both saw blades 40, 42. As seen in FIGS. 1 and 2, the saw blades 40, 42 are mounted on the saw handle 16 so as to define a vertically oriented cutting plane (per the orientation of the figures) that is generally aligned with the longitudinal axis "Z" of the hand tool 10 and the cable C.

The handles and lever 12, 14, 16 are mounted such that they can be gripped in one hand by an operator. When all three are squeezed together, the cable C is securely clamped by the clamping stud 24 against an upper wall 52 of the cable receiving handle 12, and the clamping handle 12 and saw handle 16 are moved into a cutting position. In the cutting position, the front and rear saw blades 40, 42 extend through a slot 54 defined in the upper wall 52 opposite of the clamping stud 24 and journal 26. The front and rear saw blades 40, 42 are axially spaced so as to contact successive wraps "X" and "Y" of the armor of the cable C.

By turning the crank handle 44 and continuously squeezing the handles and lever 12, 14, 16, the saw blades 40, 42 are rotated and the wraps X and Y cut respectively thereby. A pin and slot configuration between the saw handle 16 and the cable receiving handle 12 can be provided to limit penetration limits the extent to which the saw blades 40, 42 penetrate into the cable C. This penetration is sufficient to completely cut through wraps X and Y, but is insufficient to cause damage to the individual conductors "W" within the cable C. (See FIG. 2) Alternatively, engagement of the lower surface of the saw handle 16 with the upper wall 52 of the cable receiving handle 12.

Although a hand operated hand tool 10 is shown, an electrically powered hand tool 10 may also be provided by providing an electric or battery-operated motor to drive the saw blade 40, 42.

Figure 3:
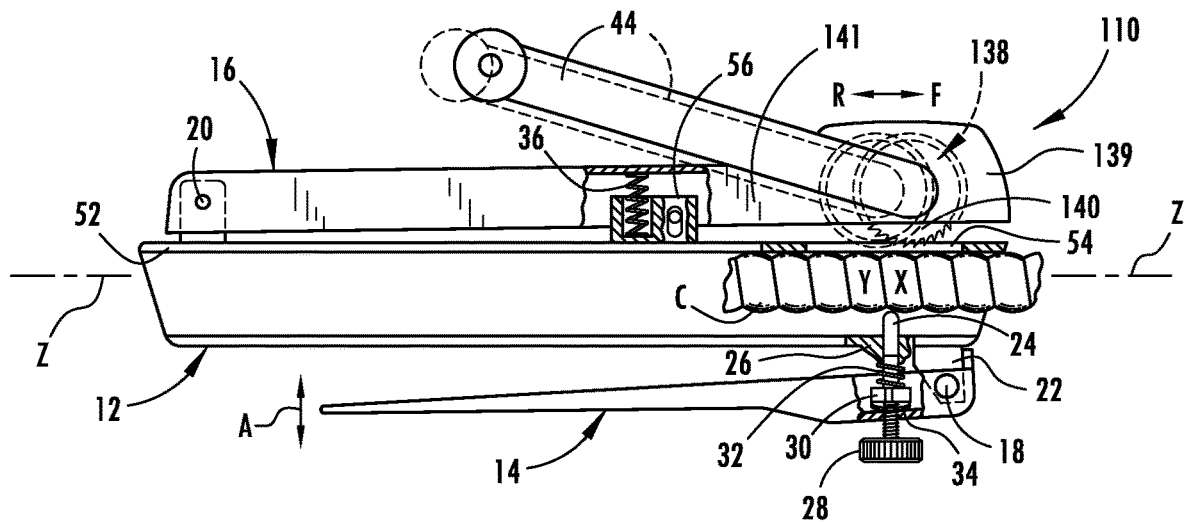
FIG. 3 is a side view, with portion broken away, of a second variation of a hand tool embodying the principles of the present invention and shown with a length of armored cable extended through the cutting zone of the hand tool.

Referring now to FIG. 3, a hand tool 110 embodying the principles of the present invention is illustrated therein. The hand tool 110 includes numerous elements that are the same as those discussed in connection with FIGS. 1 and 2. Identical elements, accordingly, are identified with the same reference numeral and the discussion thereof is not repeated in the interest of brevity. Principally, the hand tool 110 of FIG. 3 differs from the hand tool 10 of FIGS. 1 and 2 in the construction of the saw assembly.

The saw assembly 138 seen in FIG. 3 is similarly provided in and supported by the saw handle 16, generally at the end opposite of the pivot 20. However, the saw assembly 138 is only comprised of one circular saw blade 140 turned by the crank handle 44. Like FIGS. 1 and 2, the saw blade 140 is mounted on the saw handle 16 to define a cutting plane that is generally parallel with the longitudinal axis "Z" of the hand tool 110 and the cable C.

The saw assembly 138 is moveable relative to the saw handle 16 between a forward position "F", where the saw blade 140 is aligned with wrap X, and a rearward position "R", where the saw blade 240 is aligned with wrap Y. The saw assembly 138 may therefore be mounted in a slot formed in the saw handle 16, allowing the above movement, and provided with an interlock mechanism to fixedly retain the saw assembly 138 in the forward and rearward positions F and R during operation of the crank handle 44. As such, the saw assembly 138 may be adjustably or slidably mounted to the forward end of the saw handle 16 and secured in position by a thumb screw coaxial with the rotational axis of saw blade 40. Alternatively, the forward end of the saw handle 16, including the saw assembly 138, may be adjustably or slidably mounted to the rearward end of the saw handle 16. For example, the hood 139, including the saw assembly 138, may be repositionable in notches of a slot formed in the end of the arm 141 of the saw handle 16.

With the saw assembly 138 in the forward position F, by turning the crank handle 44 and continuously squeezing the handles and lever 12, 14, 16, the saw blade 140 is rotated and cuts wrap X. Next, without unclamping the cable C, the saw assembly 138 is moved to the rearward position R and, by turning the crank handle 44 and continuing to squeeze the handles and lever 12, 14, 16, the saw blade 140 is rotated and cuts wrap Y. Like previously described, penetration of the blade 140 is sufficient to cut wraps X and Y of the cable C but is insufficient to cause damage to the individual conductors "W" within the cable C.

Figure 4:
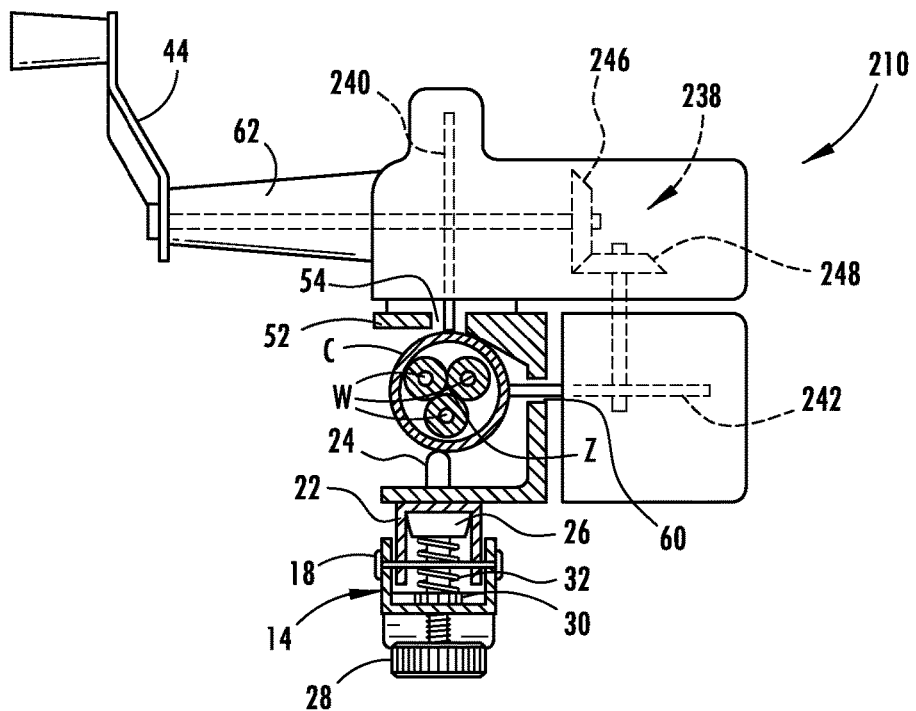
FIG. 4 is an end view, with portion broken away, of a third variation of a hand tool embodying the principles of the present invention and shown with a length of armored cable extended through the cutting zone of the hand tool.

Referring now to FIG. 4, a hand tool 210 embodying the principles of the present invention is illustrated therein. The hand tool 210 includes numerous elements that are the same as those discussed in connection with the prior variations. Accordingly, identical elements are identified with the same reference numerals and the discussion thereof is not repeated in the interest of brevity. Principally, the hand tool 210 of FIG. 4 differs from the earlier discussed hand tools 10 in the construction of the saw assembly.

The saw assembly 238 seen in FIG. 4 is similarly provided in and supported by the saw handle 16, generally at the end opposite of the pivot 20. However, the saw assembly 238 is comprised of one circular saw blade 240 located above the cable C and one circular saw blade 242 located transverse to the cable C. Both saw blades 240, 242 are turned by the crank handle 44 and a series of inter-dispersed gears 246, 248, such as the tapered gears seen herein. The rear blade 242 is supported in a rear saw handle 58 that is mounted to the cable receiving handle 12 in a manner like the saw handle 16 previously discussed, but on the rear side of the cable receiving handle 12. Like FIGS. 1 and 2, the saw blades 240, 242 are mounted on the saw handle 16 to define cutting planes that are generally parallel with the longitudinal axis Z of the hand tool 210 and the cable C.

By continuously squeezing the handles and lever 12, 14, 16, the saw blade 240 is rotated by the crank handle 44 and caused to extend through the slot 54 to cut wrap X. Simultaneously, a rear handle 58 is also is squeezed toward the cable receiving handle 12 causing saw blade 242 to extend through slot 60 and cut wrap Y. To facilitate movement of saw blade 242 toward the cable C, gear 246 may translate axially along the drive shaft 62 extending from the crank handle 44 through saw blade 240, but be rotationally fixed with the drive shaft 62. Again, penetration of both blades 240, 242 is limited so that on the wraps X and Y will be cut and so that no damage is done to the conductor W or the insulation thereon.

Figure 5:
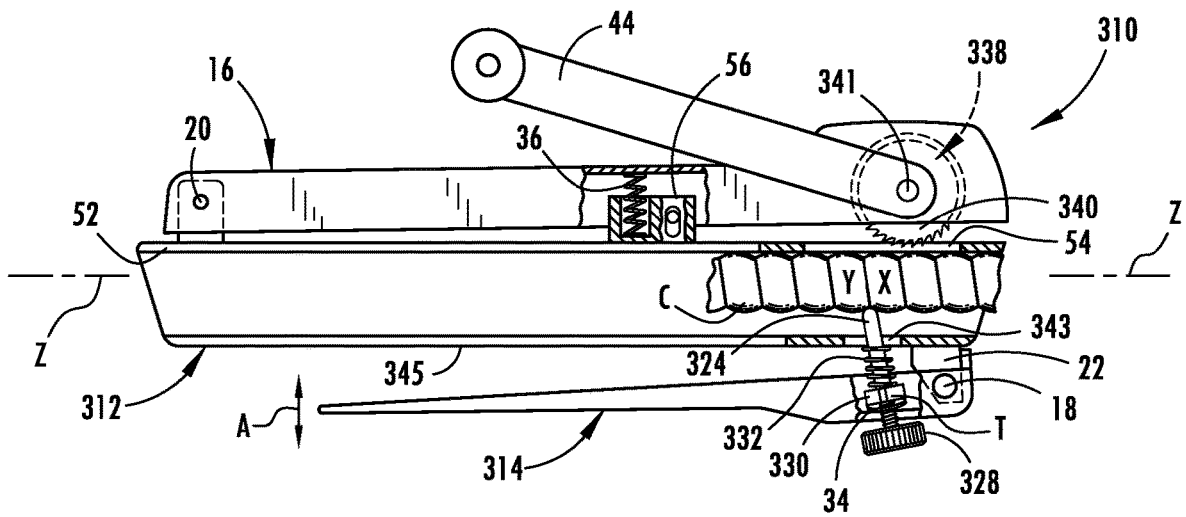
FIG. 5 is a side view, with portion broken away, of a fourth variation of a hand tool embodying the principles of the present invention and shown with a length of armored cable extended through the cutting zone of the hand tool in a first cutting position.
Figure 6:
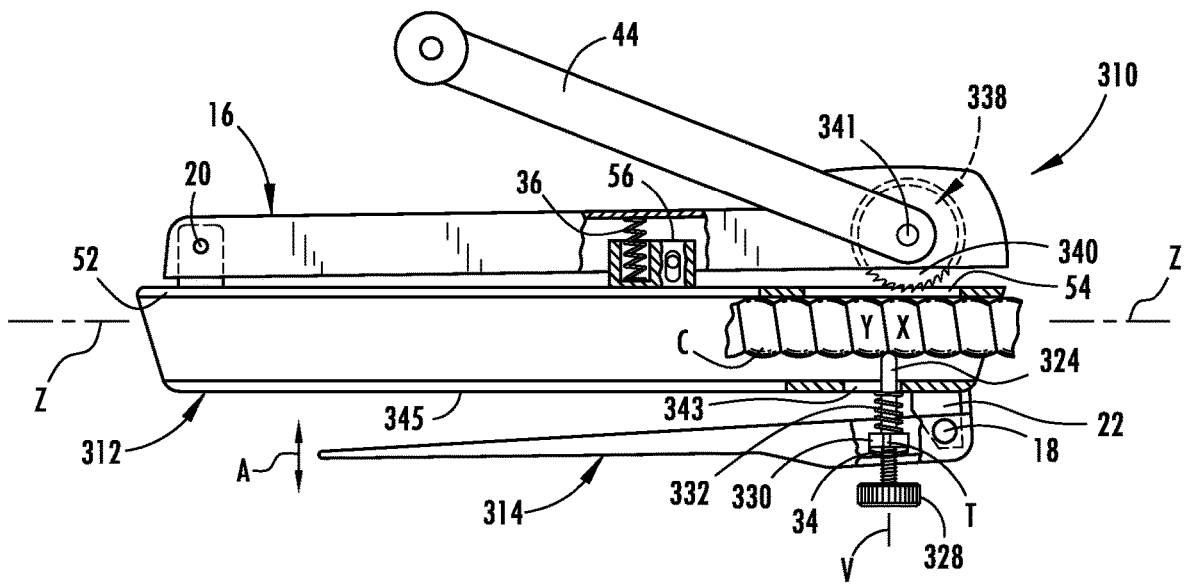
FIG. 6 is a side view similar to FIG. 5, but showing the length of armored cable in a second cutting position.

Referring now to FIGS. 5 and 6, a hand tool 310 embodying the principles of the present invention is illustrated therein. As with previously discussed variations, the hand tool 310 includes numerous elements that are the same as those discussed in connection with those variations. Identical elements are identified with the common reference numerals and the discussion thereof is not repeated in the interest of brevity. As will be appreciated for the following disclosure, the hand tool 310 of FIGS. 5 and 6 differs from the earlier discussed hand tools in the construction of the saw assembly and the clamping stud.

The saw assembly 338 includes a single saw blade 340 that is fixed in position relative to the saw handle 16 and rotatable about axle 341 by the crank handle 44. Unlike the prior variations, the clamping stem 324 and its related components are pivotable in the fore and aft directions along axis Z of the tool 310. As seen in FIG. 5, the clamping stem 324 extends through a slot 343 in a lower wall 345 of the cable receiving handle 312 and is pivoted into its rearward position. In this rearward position, the clamping stem 324 is angled toward the rear of the tool 310, which is toward the left in the FIG. 5. As seen in FIG. 6, the clamping stem 324 has been pivoted from the rearward position into its forward position. In the forward position, the clamping stem 324 is substantially upright, but could be in any orientation along the axis Z that is forward (toward the right in the FIG.) of the rearward position.

The clamping stem 324 is mounted in the clamping lever 314 in a manner permitting the above described pivoting movement. As such, the stop nut 330 may be pivotally secured to the clamping lever 314 for rotation about an axis T transverse to the axis Z of the hand tool 310. Securing the stop nut 330 in this manner also serves to prevent rotation of the stop nut 330 about the longitudinal axis of the clamping stem 324 and allows the clamping stem 324 to be advanced or retracted, relative to the cable C, by rotation of the adjustment knob 328 on the end of the clamping stem 324. A spring 332 is provided about the clamping stem 324 between the stop nut 330 and portions of the lower wall 345 defining the sides of the slot 343. As a result, the spring 332 operates to bias the clamping lever 314 away from the cable receiving handle 12.

During use, the clamping stem 324 is pivoted into its rearward position, as seen in FIG. 5, by moving the adjustment knob 328 in a forward direction. The clamping lever 314 may then be lightly squeezed towards the cable receiving handle 12 and the adjustment knob 328 rotated to advance the clamping stem 324 into engagement with the cable C. To facilitate engagement with the cable C, the end of the clamping stem 324 may be provided with a recessed shape to receive the cable C therein or another shape to engage between adjacent wraps of the cable C.

With the clamping stem 324 engaged with the cable C, the clamping lever 314 may be further squeezed so as to impinge and secure the cable C against the upper wall 52. By squeezing together the saw handle 16 and the cable receiving handle 12, the blade 340 is caused to extend through the slot 54 in the upper wall 52 of the cable receiving handle 12 and to engage the cable C. Thereafter rotation of the crank handle 44 causes the saw blade 340 to cut wrap X of the cable C.

Once wrap X has been completely cut by the saw blade 340, the squeezing force can be lessened and, by pulling rearward on the adjustment knob 328, the clamping stem 324 moved forward into its forward position. To aid in this movement, the securement of the stop nut 330 about axis T may be such that it allows for limited movement along axis V. By retaining the clamping stem 324 in engagement with the cable C during the pivoting movement, the cable C is also moved forward with the clamping stem 324. In this regard, the forward end of the slot 343 may be used to limit the pivoting movement and establish the forward position of the clamping stem 324 such that wrap Y of the cable C is properly positioned to be cut by the saw blade 340. Squeezing and operation of the saw assembly 338 may then be repeated to cut wrap Y.

With the above discussed constructions, embodiments of a hand tool are provided that can facilitate the cutting of two successive wraps of armored cable. Accordingly, the hand tools will find use in the cutting of the metal sheathing of armored cable defined by a single wrap of material, but also in the cutting of armored cable where the sheathing is defined two or more separate wraps of metallic or other armor material.

Figure 7:
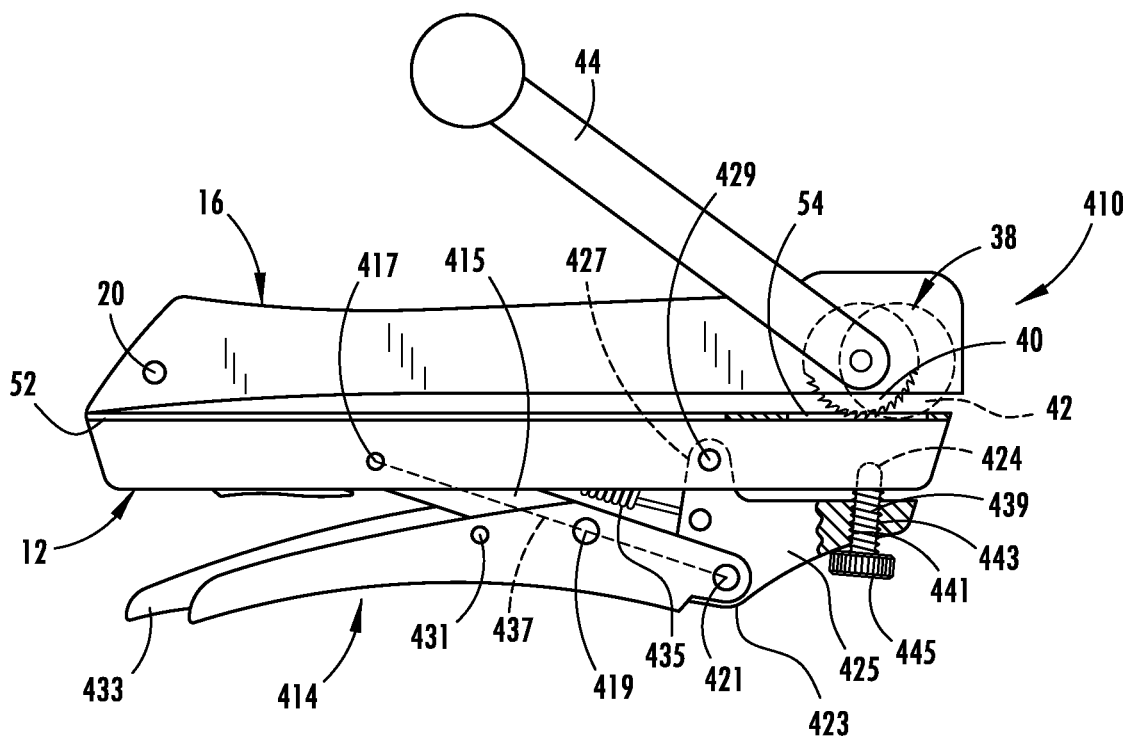
FIG. 7 is a side view of a fifth variation of a hand tool embodying the principles of the present invention and shown with a length of armored cable extended through the cutting zone of the hand tool.

Referring now to FIG. 7, a hand tool 410 embodying the principles of the present invention is illustrated therein. As with previously discussed variations, the hand tool 410 includes numerous elements that are the same as those discussed in connection with those variations. Identical elements are identified with the common reference numerals and the discussion thereof is not repeated in the interest of brevity. As will be appreciated for the following disclosure, the hand tool 410 of FIG. 7 differs from the earlier discussed hand tools in the construction of the clamping lever 414.

The saw assembly 38 seen in FIG. 7 is similarly provided in and supported by the saw handle 16 as discussed above in connection with FIG. 1. By squeezing the handles and lever 12, 414, 16 together, the saw blades 40, 42 are pivoted about pivot 20 and caused to extend through the slot 54 to engage the armor of the cable C (not shown). Rotation of the crank handle 44 causes the saw blades 40, 42 to penetrate through the wraps (not shown) of the cable C.

For operator convenience, the clamping lever 414 is capable of locking in a clamped position. In order to achieve locking, the clamping lever 414 is connected to the cable receiving handle 12 by a connecting rod 415. The connecting rod 415 extends from a first pivot 417 in the handle 12 to a second pivot 419 in the clamping lever 414.

The clamping lever 414 also includes a third pivot 421, which is located forward (toward the right in FIG. 7) of the second pivot 419 and at the forward most end of the clamping lever 414. This third pivot 421 couples the clamping lever 414 with a pawl 423 of a moveable linkage 425. The moveable linkage 425 includes a second pawl 427 in which is fourth pivot 429 is provided in association with the cable receiving handle 12.

The locking in the clamped position operates on a 4 bar-linkage principle where the relationship of first, second and third pivot 417, 419, 421 is able to move to an over-center position, seen in FIG. 7, where the second pivot is above a centerline 437 defined between the first and third pivots 417, 421. In the over-center position, the moveable linkage 425 is caused to rotate, counter clockwise in FIG. 7, causing a clamping stem 424 to be brought into engagement with the cable C and forcing the cable C into engagement with the saw blades 40, 42.

Mounted to the clamping lever 414 at pivot 431 is a release lever 433. By lifting on the release lever 433, the clamping lever 414 is caused to move downward, away from and cable receiving handle 12. This movement is aided by a spring 435 extended between the cable receiving handle 12 and the moveable linkage 425. With this movement of the clamping lever 414, the moveable linkage 425 is cause to rotate counter clockwise about the fourth pivot 429 and the second pivot 419 moves to a position below the centerline 437. In this position, the clamping stem 424 is positioned away from the cable C.

To accommodate different sized cables, the clamping stem 424 is adjustable relative to the moveable linkage 425. As seen in FIG. 7, the clamping stem 424 is provided with external threads 439 that engage corresponding internal threads 441 of a bore 443 through the moveable linkage 425. For easy adjustment, the clamping stem 424 includes a thumb screw or knob 445 on its distal end.

Figure 8:
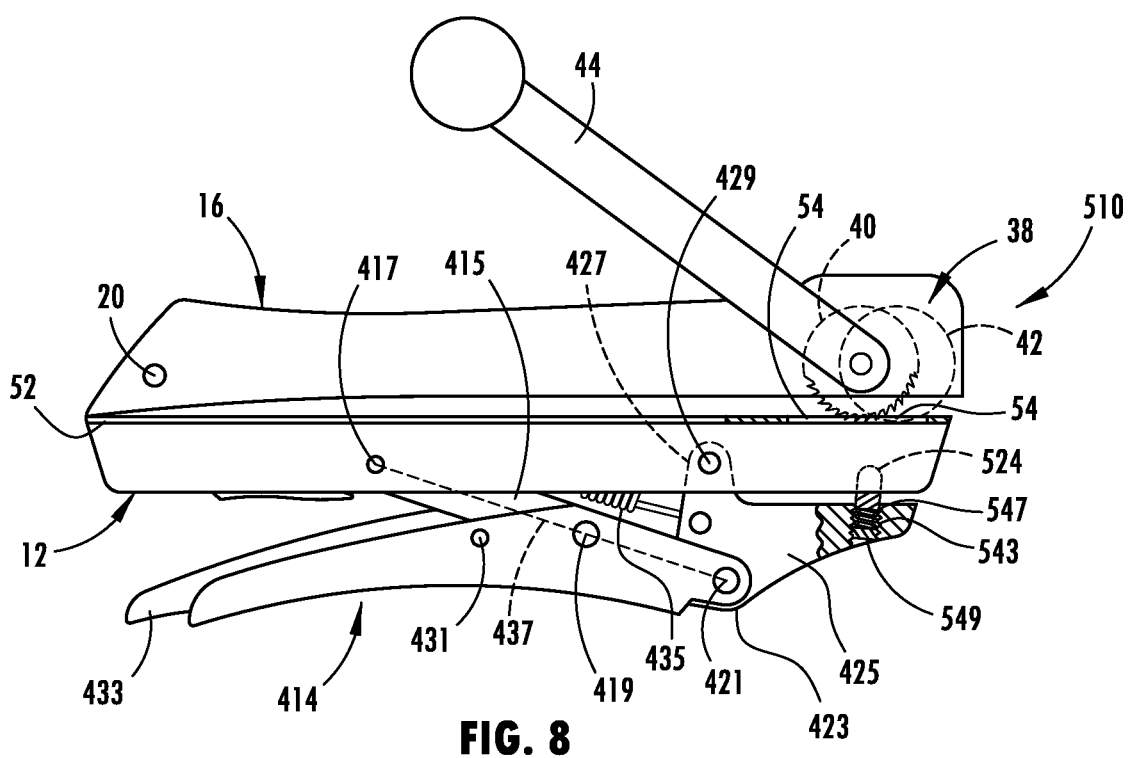
FIG. 8 is a side view of a fifth variation of a hand tool embodying the principles of the present invention and shown with a length of armored cable extended through the cutting zone of the hand tool.

In an alternative embodiment to that of FIG. 7, instead of being adjustable via the thumb screw 445, the hand tool 510 of FIG. 8 includes a clamping stem 524 that is spring biased. A spring 547 is coupled to the distal end of the clamping stem 524 and operates to bias the spring toward the cable C. The clamping stem 524 and spring 547 may be received in a bore 543 that extends part way through the moveable linkage 425 or may be retained therein by an end cap 549 engaged with threads in the bore 543.

Figure 9:
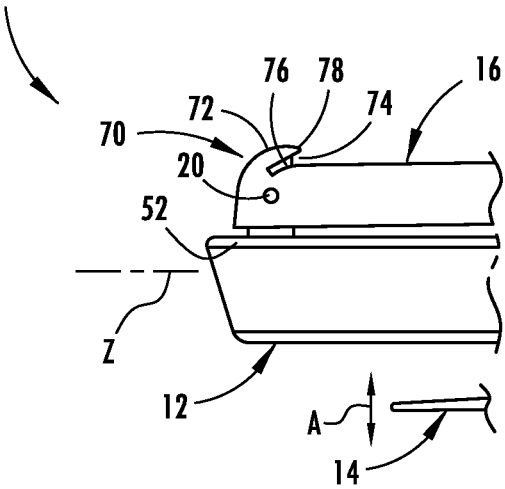
FIG. 9 is a partial view of a hand tool incorporating a tape cutting feature.

As represented in FIG. 9, a hand tool embodying the principles of the present invention may additionally incorporate a tape cutter 70 into its construction. As illustrated, the tape cutter 70 is provided on an upper end of the saw handle 16 adjacent to the pivot 20. The tape cutter 70 includes a guard 72 defining a recess 74 within which fixed blade 76 is positioned. Preferably, the blade 76 is set back within the recess 74 such that the fixed blade 76 will not be inadvertently contacted by a user's hand or fingers. Thus, the tip 78 of the guard 72 extends over and beyond the leading edge of the fixed blade 76. As will be readily appreciated, the tape cutter 70 may be incorporated into any of the hand tools 10, 110, 210, 310, 410, 510, 610, 710, 810 seen in FIGS. 1 and 3-5, 7, 8, 11, 13, and 14-16, which is the intended representation by the partial view of the FIG. 9, as well as any of the hand tools of the disclosures incorporated by reference.

Figure 10:
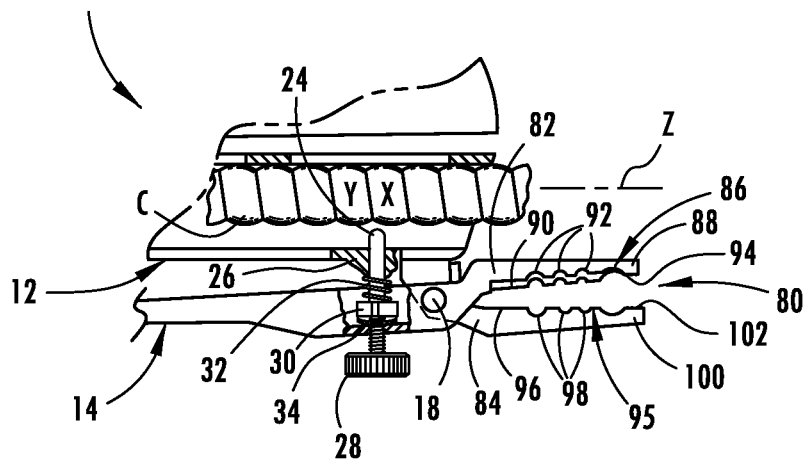
FIG. 10 is a partial view of a hand tool incorporating a wire stripping pliers feature.

Referring now to FIG. 10, a hand tool embodying the principles of the present invention may additionally incorporate wire stripping pliers 80 into its construction. As seen in FIG. 10, the wire stripping pliers 80 include an upper jaw 82 and a lower jaw 84. The upper jaw 82 is formed unitarily or integrally as an extension of the clamping lever 14, forward of the pivot 18. The lower jaw 84 is similarly formed unitarily or integrally as an extension of the cable receiving handle 12, forward of the pivot 18.

An inner edge of one of the jaws 82, 84 is formed as a knife edge 86 that is ground and sharpened (this is illustrated as the upper jaw 82 in FIG. 10) and which extends over a majority of the length of the jaw 82, except for the terminal end portion 88. The knife edge 86 includes a straight section 90 for cutting wire and a series of semi-circular recesses 92 for cutting and stripping insulation from various gage wires. The terminal end portion 88 of the jaw 82 is provided with a toothed grip 94 that includes both rounded and straight sections for versatility when gripping is needed.

An inner edge of the opposing jaw 82, 84 (illustrated as the lower jaw 84) is formed as an opposing edge 94. The opposing edge 94 need not be ground or sharpened, but may be so provided if desired. Like the knife edge 86, the opposing edge 94 includes a straight section 96 and a series of semi-circular recesses 98. The straight section 96 cooperates with the straight section 90 of the knife edge 86 for cutting wire and the series of semi-circular recesses 98 cooperate with the semi-circular recesses 92 of the knife edge 86 for cutting and stripping insulation from various gage wires. The terminal end portion 100 of the lower jaw 84 is similarly provided with a toothed grip 102 that includes both rounded and straight sections, which cooperate with the round and straight section of the toothed grip 94 of the upper jaw 82.

As provided, the upper and lower jaws 82, 84 of the wire pliers 80 provide the hand tool added functionality enabling the grasping, manipulation and cutting of conductors W stripped of the armored sheathing, as well as the stripping of insulation from the conductors W themselves.

The wire stripping pliers 80 may be incorporated into any of the hand tools 10, 110, 210, 310, 410, 510, 610, 710, 810 seen in FIGS. 1, 3-5, 7, 8, 11, 13, and 14-16, which is the intended representation by the partial view of the FIG. 10, as well as any of the hand tools of the disclosures incorporated by reference.

Figure 11:
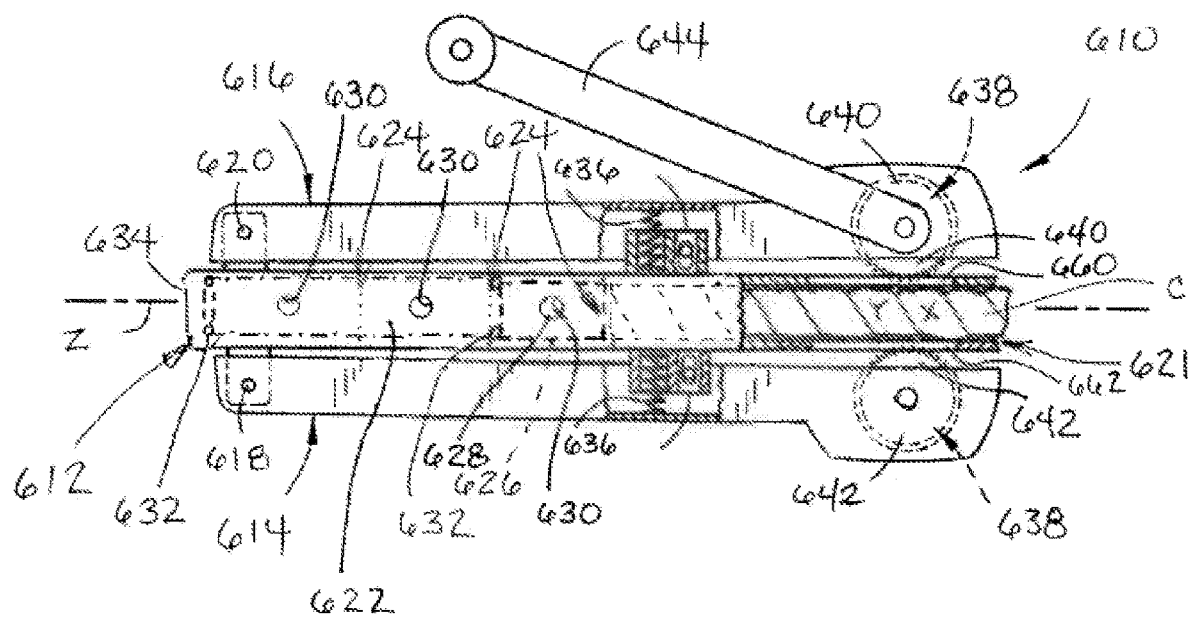
FIG. 11 is a side view of a further variation of a hand tool embodying the principles of the present invention and shown with a length of armored cable extended through the cutting zone of the hand tool.

Referring now to FIG. 11, a further variation of a hand tool embodying the principles of the present invention is illustrated therein and designated at 610. The hand tool 610 includes as its principle components a cable receiving handle 612 and a pair of opposed saw handles 614, 616. In the figure, saw handle 616 is the upper saw handle 616 and saw handle 614 is the lower saw handle 614, which is provided in lieu of a cable clamping lever 14.

As in the prior variations, the upper saw handle 616 is hingedly connected to an end of cable receiving handle 612 at a rear pivot 620. Unlike the prior variations, the lower saw handle 614 is hingedly connected to the same end of the cable receiving handle 612 as the upper saw handle 616, except at a rear pivot 618 on the lower side of the cable receiving handle 12.

The cable receiving handle 612 may be at least partially C-shaped in cross-section with the C-shape being open to a lateral side of the hand tool 610 to define a channel 621 for receiving a cable C therein. The remaining portion of the cable receiving handle 612 may have a rectangular or closed box shape wherein the open lateral side of the channel 621 is provided with a side wall 622.

This side wall 622 may further include a plurality of stop locations 624 that limit the depth to which the cable C can be inserted into the hand tool 610. The stop locations 624 are illustrated as being cooperative defined by a stop block 626 moveable located within the channel 621 and held in position by one or more detents 628 on the stop block 626 and apertures 630 in the side wall 622 and an opposing wall of the cable receiving handle 612. The stop block 626 is preferably biased by a spring 632 received in the box shaped portion of the cable receiving handle 612, between and end wall 634 thereof and the stop block 626. In this manner, the stop block 626 may be moved between the various stop locations 624 by depressing the detents 628 and adjusting the position of the stop block 626 against the biasing force of the spring 632 using the cable C. The stop locations 624 can therefore provide that a common length of armor, for example four, six or eight inches of armor, is repeatedly removed by the hand tool 610.

As previously noted, the saw handles 614, 616 respectively pivot on the pivots 618, 620. Springs 636, located between the saw handles 614, 616 and the cable receiving handle 612, bias the saw handles 614, 616 toward a non-cutting position spaced away from the cable receiving handle 612 and, similar to the prior variations, a pin and slot engagement 664 between the saw handles 614, 616 and the cable receiving handle 612 (with the pins mounted in the saw handles 614, 616 and the slots formed in extensions from the cable receiving handle 612) can be provided to limit the extent to which the saw blades 640, 642 are biased apart in the non-cutting position.

Provided in and supported by the saw handles 614, 616, generally at the end of the tool 810 opposite of the pivots 618, 620, is a saw assembly 638. The saw assembly 638 includes two, opposed circular saw blades 640, 642 that are caused to rotate by a crank arm 644 and interconnected gears 646, 648, 650, 652, such as the tapered gears of FIG. 12. The saw assembly 638 may therefore be viewed as having upper and lower portions 638A, 638B.

The saw blades 640, 642 are oriented on the saw handles 614, 616 so as to define a cutting plane Pc that intersects central axis Z of the hand tool 610 and the cable C. As illustrated and oriented in the figures, the cutting plane Pc is vertically oriented and the saw blades 640, 642 are diametrically opposed. As will be appreciated, however, the hand tool 610 may be operated with the cutting Pc in other orientations and the construction of the saw assembly 638 may be such that the saw blades 640, 642 offset along the length of the hand tool 610.

The crank arm 644 is mounted to support 662 and input shaft 654 extends from the crank arm 644 through the support 662 to the upper saw blade 640 and terminates adjacent to taper gear 646, which is also mounted on the input shaft 654. This first taper gear 646 is in meshed engagement with the second taper gear 648 so as to reorient the rotation 90 degrees relative to the input shaft 654 and along as axis parallel to the cutting plate Pc and through an intermediate shaft 656. On the opposite end of the intermediate shaft 656, the third tapered gear 650 is mounted so as to rotate therewith. The third tapered gear 650 meshes with the fourth tapered gear 652, which again reorients the rotation by 90 degrees. The fourth tapered gear 652 is mounted on an output shaft 658, supported by the lower blade handle 614 generally parallel to the input shaft 654. Mounted on the end of output shaft 658, for rotation therewith, is the lower saw blade 642, which is mounted thereon to rotate with the input shaft 654. Thus, upon rotation of the crank arm 644, both saw blades 640, 642 are rotated.

The intermediate shaft 656 extends through and may be supported by a portion of the cable receiving handle 612. Preferably, the intermediate shaft 656 is provided with a construction that allows the opposes ends of the shaft 656, and therefore the second and third tapered gears 648, 650, to axially move relative to one another during squeezing together of the saw handles 614, 616. In one example of such a construction, movement is permitted through a splined engagement between two portions of the shaft 656.

By squeezing together the upper and lower saw handles 616, 614, the upper saw blade 640 is caused to extend through an upper slot 660 in an upper wall of the cable receiving handle 612 and to engage wrap X of the cable C. Similarly, the lower saw blade 642 is caused to extend through a lower slot 662 in a lower wall of the cable receiving handle 612 and to engage wrap Y of the cable C.

As in the prior variations, the penetration depth of both blades 640, 642 is limited so that only wraps X and Y are cut and without damage to the conductors W or the insulation thereon. This penetration depth is controlled by a depth adjustment mechanism 664 supported in a portion of the cable receiving handle 612.

Figure 12:
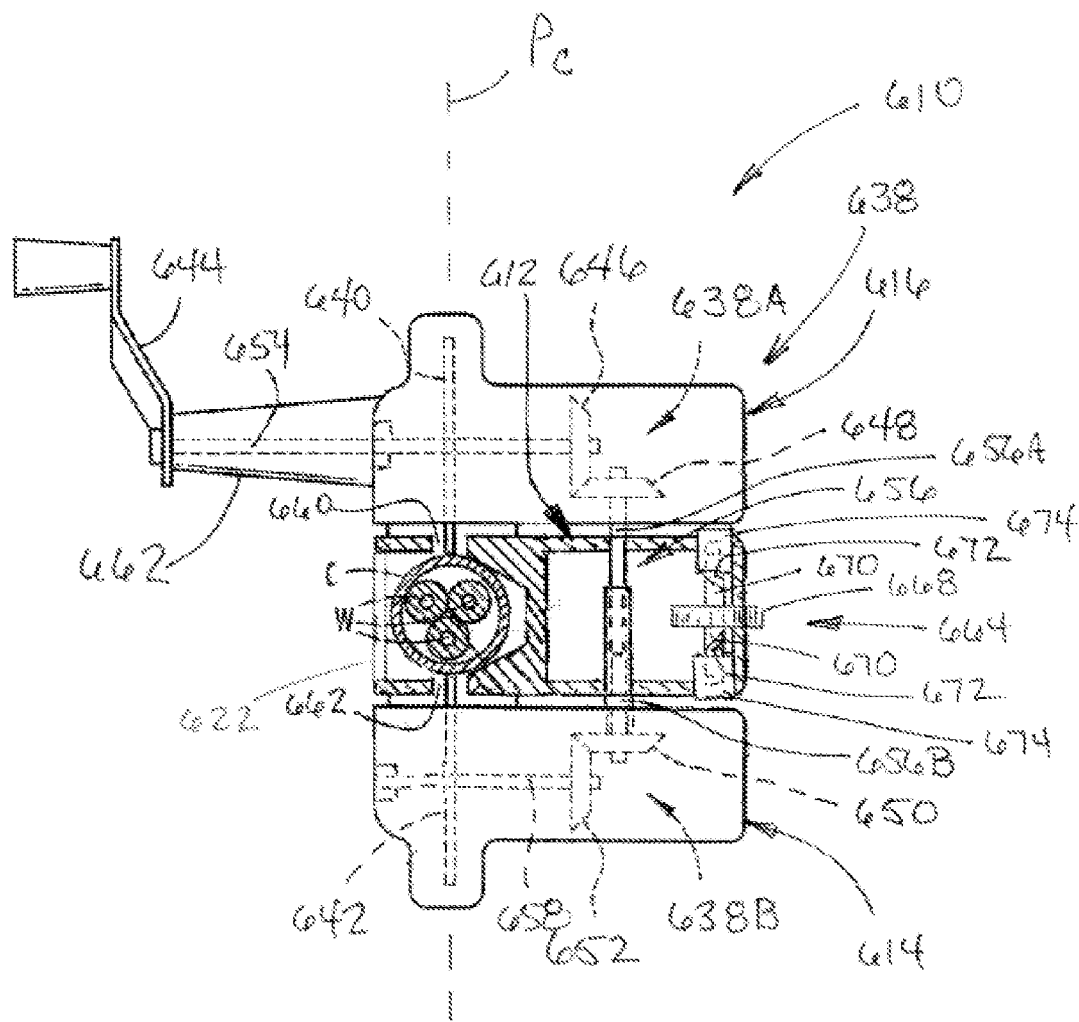
FIG. 12 is an end view, with portion broken away, of the variation of the hand tool seen in FIG. 11.

As seen in FIG. 12, the depth adjustment mechanism 664 includes a thumb wheel 668 fixedly and centrally mounted on a drive shaft 670, the latter of which extends from the thumb wheel 668 in opposite direction toward both the lower saw handle 614 and the upper saw handle 616. The opposed ends 672 of the drive shaft 670 are oppositely threaded and provided with stop caps 674 moveably engaged on the threads. Apertures defined in the upper and lower walls of the cable receiving handle 612 receive the stop caps 674, which have a length allowing them to extend through the apertures. The perimeter of the stop caps 674 and the apertures are correspondingly shaped such that the stop caps 674 are able to axially move through the apertures, but are rotationally restricted by the apertures.

As a result of the rotational restriction, during rotation of the drive shaft 670 via the thumb wheel 668, the distance at which the stop caps 674 extend through the apertures is synchronously controlled. In turn, this distance limits the depth at which the saw blades 640, 642 can extend through the slots 660, 662 and penetrate the armor of the cable C because of engagement of the lower and upper saw handles 614, 616 with the stop caps 674. As will be appreciated, rotation of the thumb wheel 668 in one direction will advance the stop caps 674 outwardly thereby decreasing the penetration depth, and rotation of the thumb wheel 674 in an opposite direction will retract the stop caps 674 into the cable receiving handle 612 thereby increasing the penetration depth. At least a portion of the thumb wheel 668 is accessible on an exterior side of the cable receiving handle 612, preferably through a slot defined therein.

The construction seen in FIG. 12 of the depth adjustment mechanism 664 is just one implementation of such a mechanism. Other constructions controlling the depth to which the saw blades penetrate the armor of the cable C may alternatively be incorporated into the hand tool 610

The saw handles 614, 616 and cable receiving handle 612 are mounted such that they can be gripped in one hand by an operator. When all three are squeezed together, the cable C is securely clamped between the saw blades 640, 642 in a cutting position, where the blades 640, 642 extend through the slot 660, 662.

By turning the crank arm 44 and continuously squeezing the saw handles 614, 616, the saw blades 640, 642 are rotated and the wraps X and Y are respectively cut thereby. Preferably, the direction of rotation of the saw blades 640, 642 pushes the cable C into the hand tool 610. As the saw blades 640, 642 proceed through the armor, the penetration is eventually sufficient to completely cut through wraps X and Y, but is insufficient to cause damage to the individual conductors "W" within the cable C as a result of the stop adjustment mechanism 664.

As a result, wraps X and Y of the armor are cut on opposing sides of the cable C and each cut wrap X, Y exhibits the same length along the conductors W residing therein. Accordingly, when the stripped cable C is thereafter inserted into a box or conduit connector for connection to an electrical box, fixture or panel, the remaining armor of the cable C is equally provided, with respect to its length, about the conductors W. Providing the remaining armor in this manner better ensures that the armor of the cable C is properly engaged by the box connector and positively retained therewith without potential damage to the conductors W.

Figure 13:
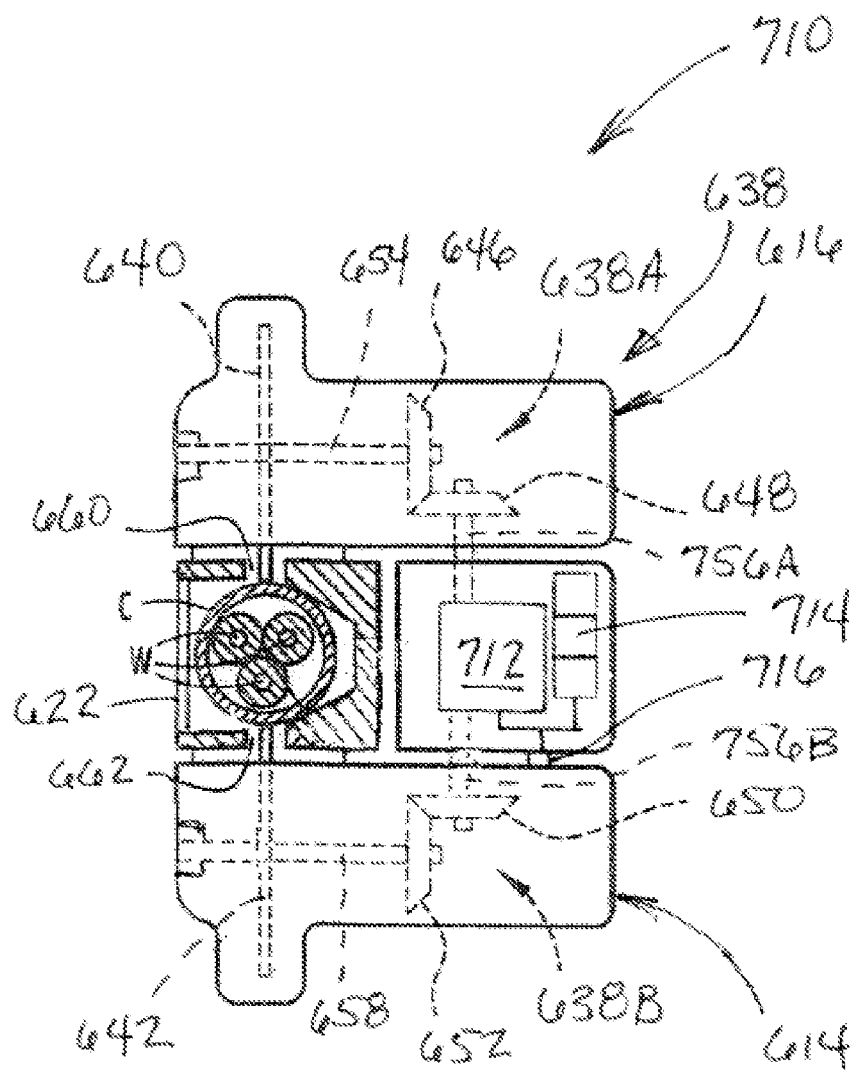
FIG. 13 is an end, with portion broken away, of another variation of the hand tool.

Referring now to FIG. 13, an electrically powered hand tool 710 may also be provided. The hand tool 710 of FIG. 13 is similar in construction to the hand tool 610 seen in FIGS. 11 and 12, including the stop adjustment mechanism 664. The principal difference, however, is that the input for rotating the saw blades 640, 642 is a motor 712 instead of the crank arm 644, which is accordingly eliminated. The motor 712 is preferably a direct current motor and is coupled to and energized by an interchangeable battery pack 714.

Rotary output from the motor 712 drives both the upper and lower portions 756A, 756B of an intermediate shaft 756, which are the input shafts to the upper and lower portions 638A, 638B of the saw assembly 638.

A switch 716 may be located so as to close and cause operation of the motor 714 whenever the saw handles 614, 616 are squeezed together by positioning the switch 716 between one of the saw handles 614, 616 and the cable receiving handle 612. Alternatively, the hand tool 710 may be provided with a thumb or other switch (not shown) on an exterior portion of the saw handle 614, 616.

Figure 14:
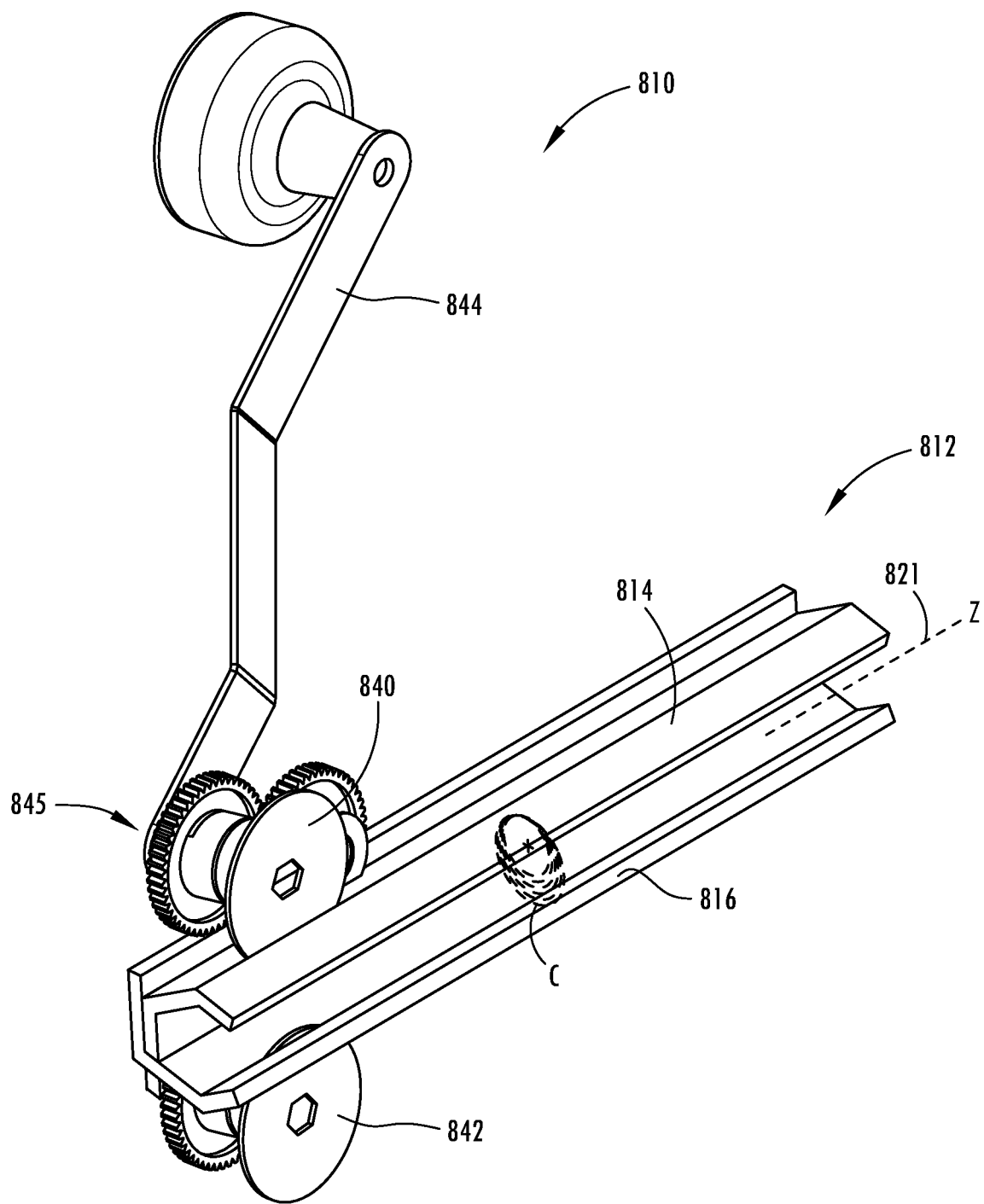
FIG. 14 is a top right perspective view depicting another variation of hand tools embodying the principles of the present invention, particularly embodiments that include two channel members as a cable receiving handle.
Figure 15:
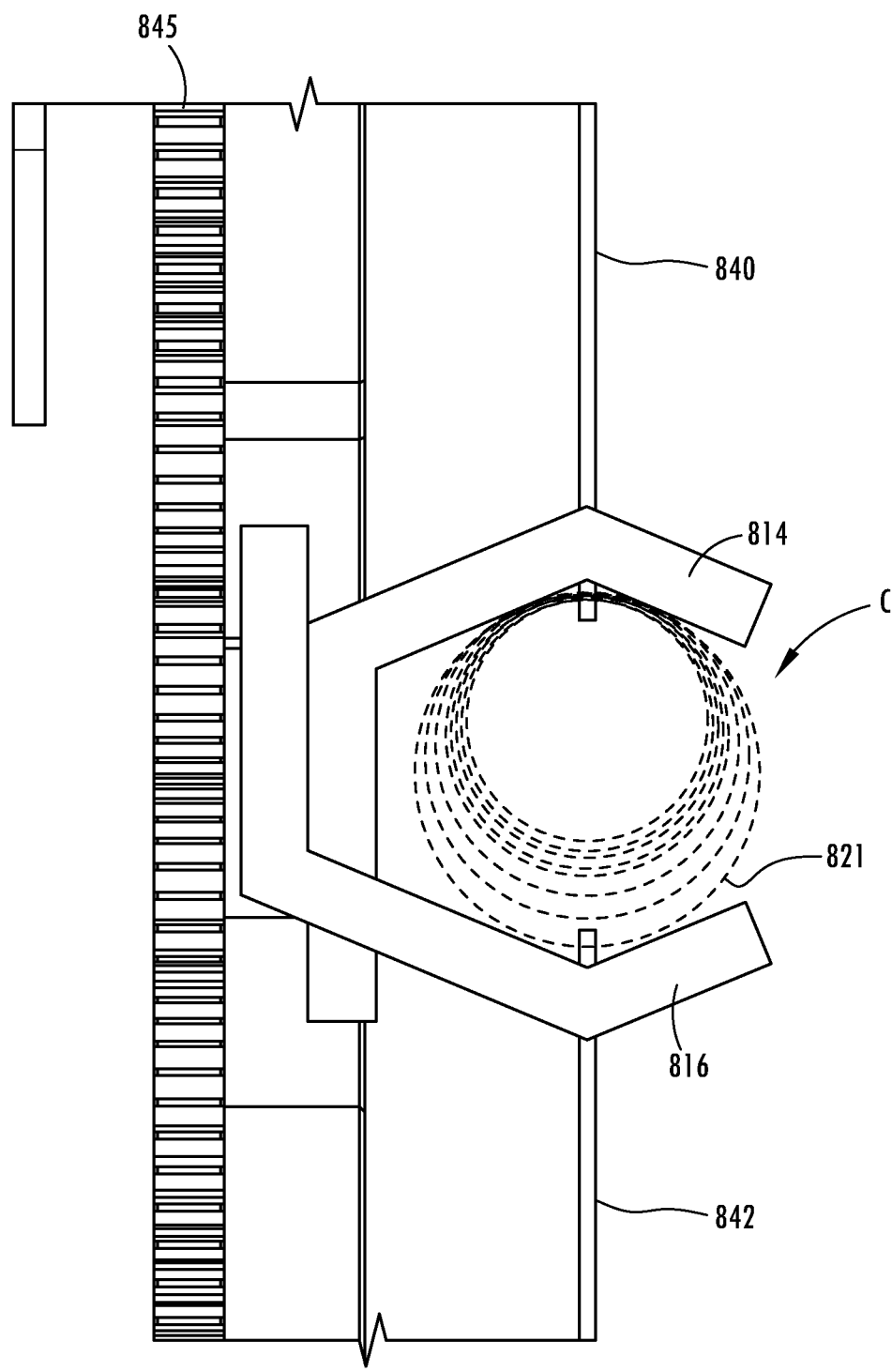
FIG. 15 is a partial left side view of the embodiments depicted in FIG. 14.
Figure 16:
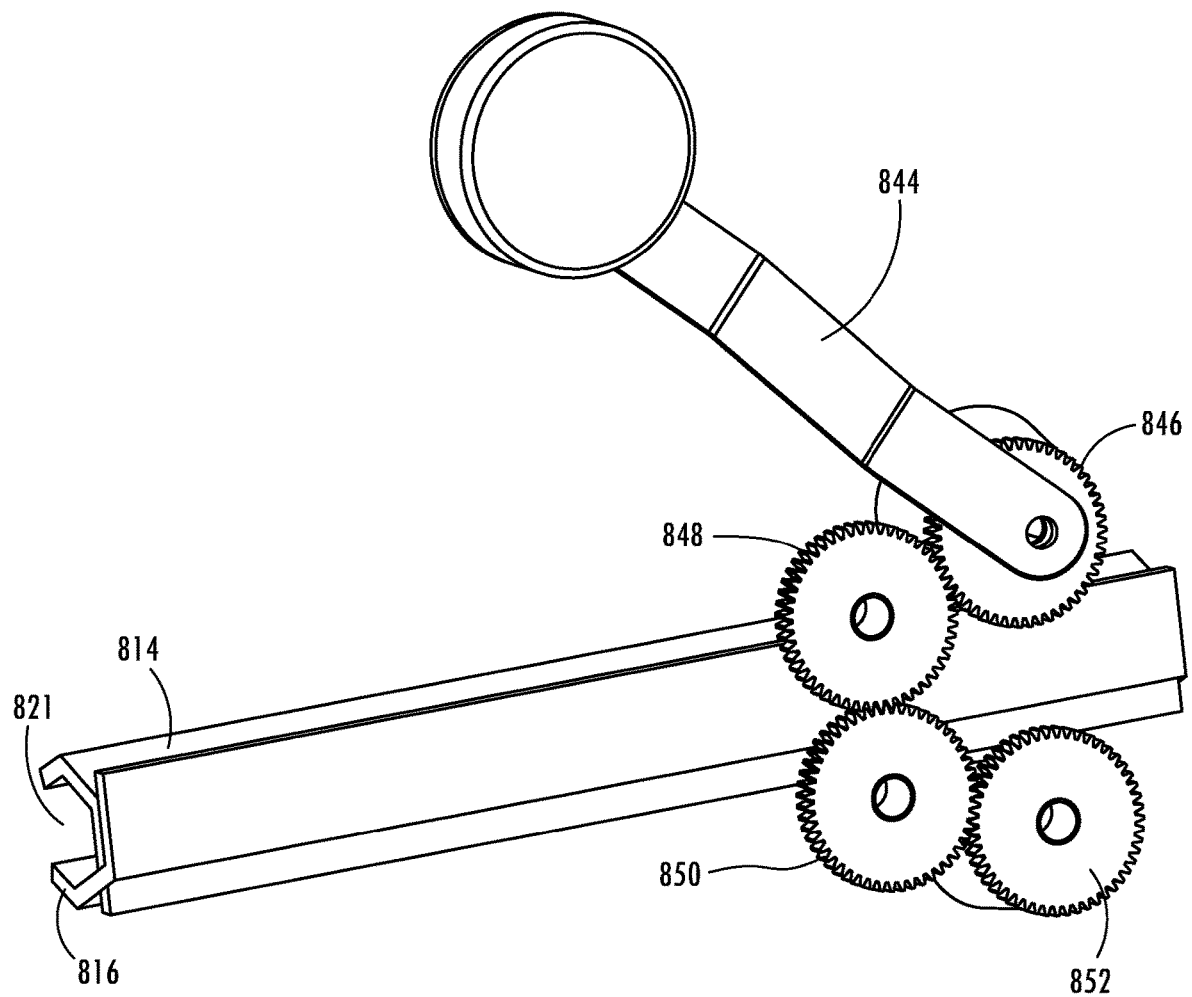
FIG. 16 is a back side view of the embodiments depicted in FIG. 14.

Certain embodiments of stripping tools contemplated herein can comprise a cable receiving handle formed as two interlocking parts. As shown in FIGS. 14-16, hand tool 810 is provided as representing a group of embodiments contemplated herein, and shown with certain features omitted from the design for clarity. Embodiments encompassed by FIGS. 14-16 (and FIGS. 17-19 described below) may provide advantageous alternatives representing a simplified construction and operation as compared to embodiments which further comprise saw handles, pivot points, cable clamping means, and blade depth adjustment mechanisms as independent components. By providing cable receiving handle as a first channel member slidably connected to the hand tool relative to a second channel member, the resulting hand tools can omit from their design a blade adjustment mechanism, an independent gripping mechanism, an independent cable stop mechanism, or any combination thereof.

Referring now to FIG. 14, hand tool 810 is shown to comprise cable receiving handle 812, two opposed circular saw blades 840, 842 each disposed within respective slots of cable receiving handle 812, and a crank arm 844 to operate rotation of blades 840, 842, for instance against an armor layer of cable having width C when the armor layer is positioned within the cable receiving channel 821 defined at least in part by first and second channel members 814, 816. A series of interlocking gears 845 (representing the entire series of gears 846, 848, 850, and 852 represented in FIGS. 15-16) serve to transfer force from the rotation of crank arm 844 to the rotation of blades 840, 842. As is shown, the channel members 814, 816 can be slidably connected directly to one another, and can forms a C-shaped cable receiving channel 821 configured to receive and restrain armored cable of varying widths C. Similar to FIG. 11, in certain embodiments, hand tool 810 may comprise a spring biasing channel members 814, 816 into a non-cutting, open position.

Channel members 814, 816 may be slidably connected to hand tool 810 in any fashion suitable to provide variable width channel 821. In certain embodiments, as shown in FIG. 14, a first channel member 814 may be inserted within an axial slot of second channel member 816, the axial slot extending generally parallel to axis Z of the channel 821. Further, the cable channel members can comprise one or more lateral slots extending generally perpendicular to axis Z of channel 821, and overlapping an analogous lateral slot on the opposing channel member. In this fashion, a fastener may be applied through the slots which retain the back wall of the first channel against the back wall of the second channel member during adjustment. Suitable slots and fasteners to retain the channel members in the arrangement shown in FIGS. 14-16 would be readily understood by a person of ordinary skill in the art, and are omitted from FIGS. 14-16 only for clarity.

Referring now to FIG. 15, blades 840, 842 may extend within channel 821 to a depth suitable to cut through an armor layer of cable C, without damaging internal components, like other variations described herein. The position of blades 840, 842 may be fixed relative to channel members 814, 816 respectively, allowing immediate adjustment based on the motion of channel members instead of a secondary blade adjustment. Alternatively, the hand tool 810 may further comprise an independent blade depth adjustment mechanism, as are described herein for other variations.

Referring now to FIG. 16, the arrangement of interlocking gears 846, 848, 850, 852 can be any that are suitable to transfer the motion of crank arm 844 to cutting blades 840 and 842. In the embodiment shown, each of the series of interlocking gears is in a planar arrangement. A housing may be provided, such as the support 662 of FIG. 12, and are omitted from FIG. 16 only for clarity. Gear shafts connecting the crank arm 844 to the cutting blades 840, 842 also are not shown in the FIGS. 14-16, but can be present in certain embodiments, either within a support or housing, or exposed. The position of the interlocking gears may each be independently fixed or mobile. For instance, it is contemplated that in certain embodiments the position of each of the interlocking gears can remain in a fixed position relative to the cable receiving handle as a whole, or relative to the first or second channel member.

In contrast, the position of the gear axis of at least one of the intermediate gears 848, 850 may be mobile to allow the gears to remain engaged with fixed gears 846, 852 as the channel members 814, 816 are moved in any position. Such arrangements allow for the width of the cable receiving channel to be varied without altering the blade depth of blades 840, 842, and also without disengaging the crank arm 844 from the series of gears that drive saw blades 840, 842. In certain embodiments, this mobile gear arrangement may be achieved by attachment of a fixed length pivot plate or rod around the gear shaft of any mobile gears to the gear shaft of adjacent interlocking gears. Other arrangements allowing mobile gears to adjust position of the respective gear axes while keeping any mobile gears engaged with the fixed gears are also contemplated herein.

Figure 17:
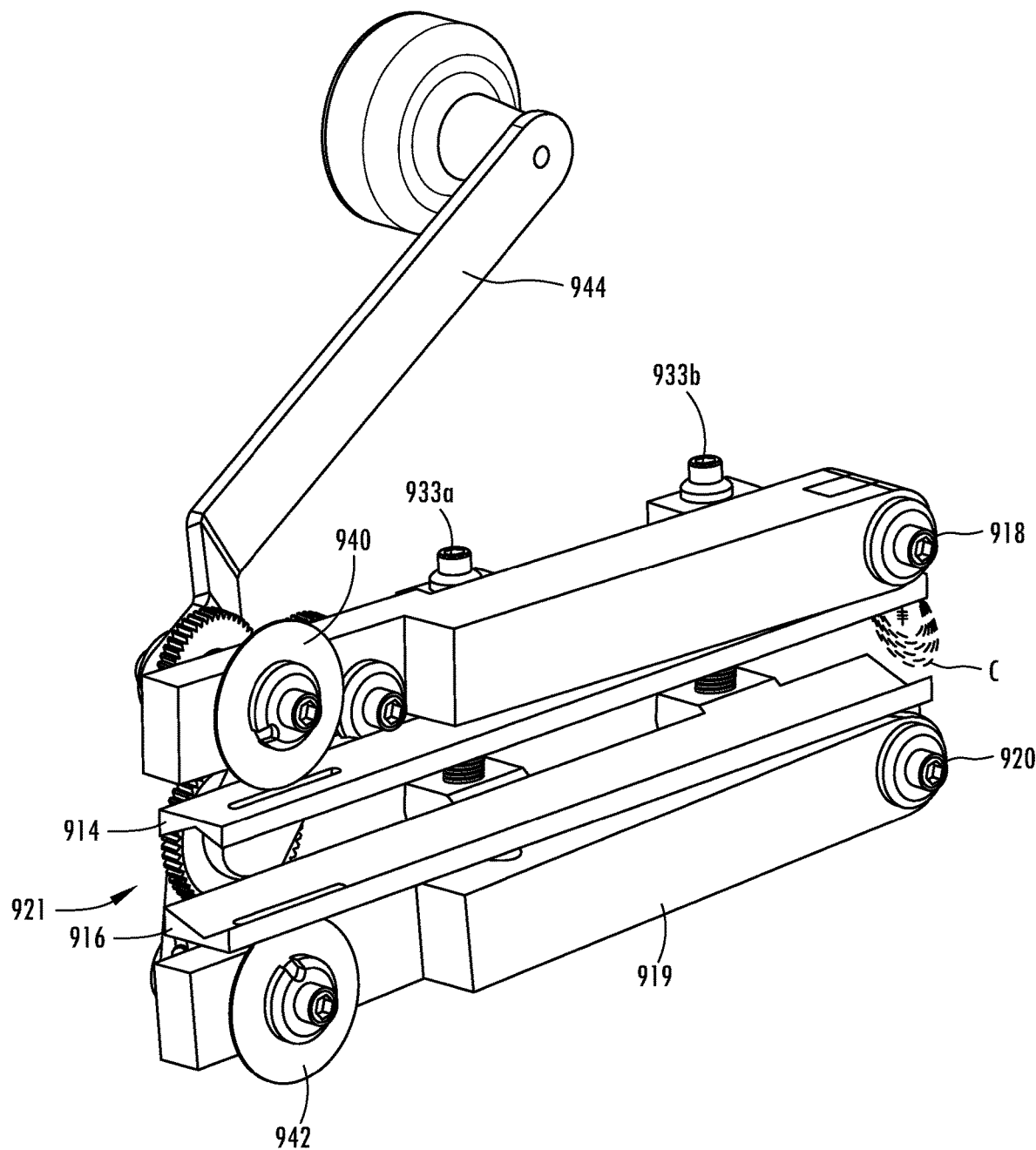
FIG. 17 is a top right perspective view depicting another variation of a hand tool of embodying the principles of the present invention, and particularly a variation of the embodiment shown in FIGS. 14-16.
Figure 18:
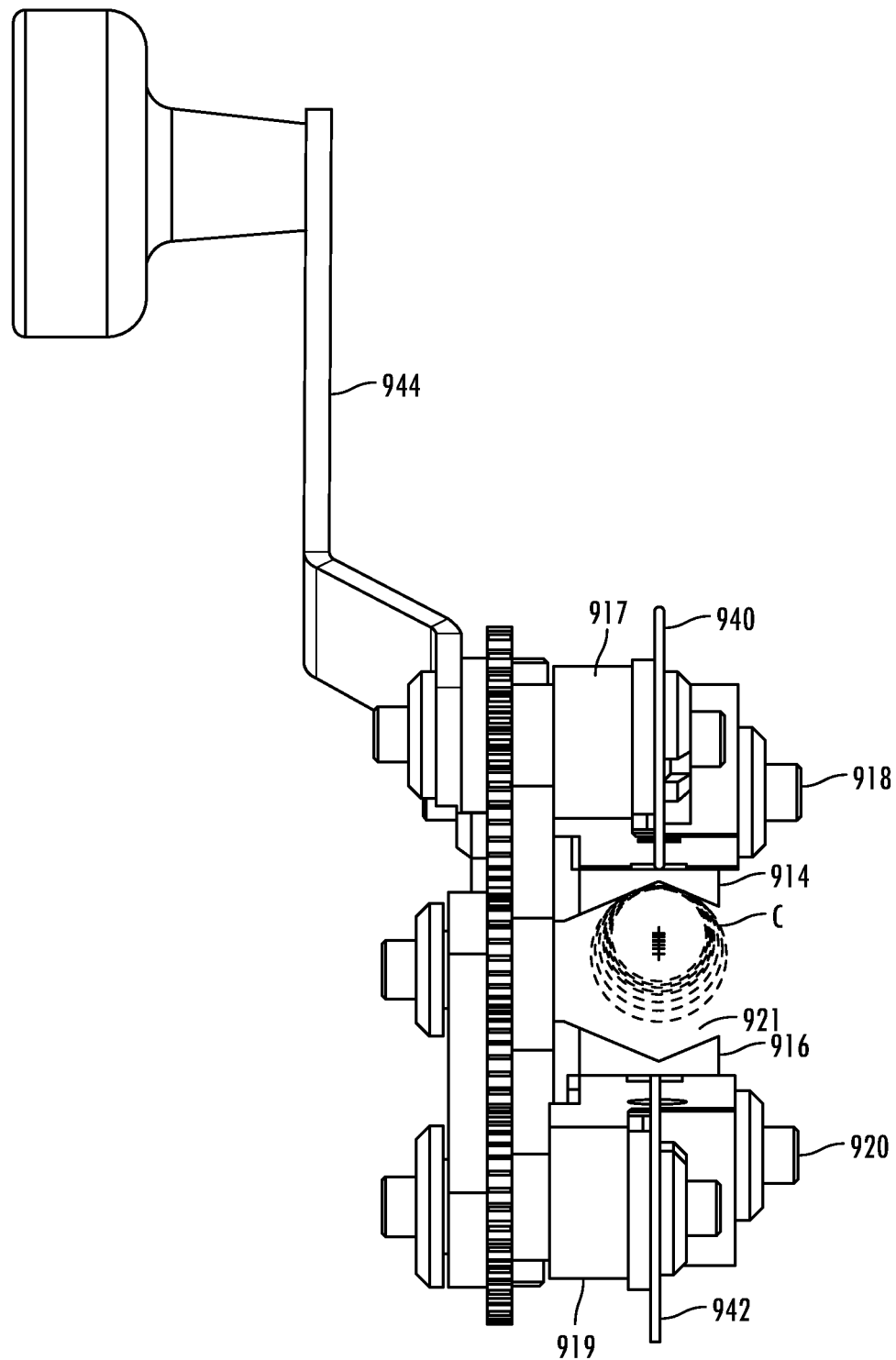
FIG. 18 is a left side view of the hand tool shown in FIG. 17.
Figure 19:
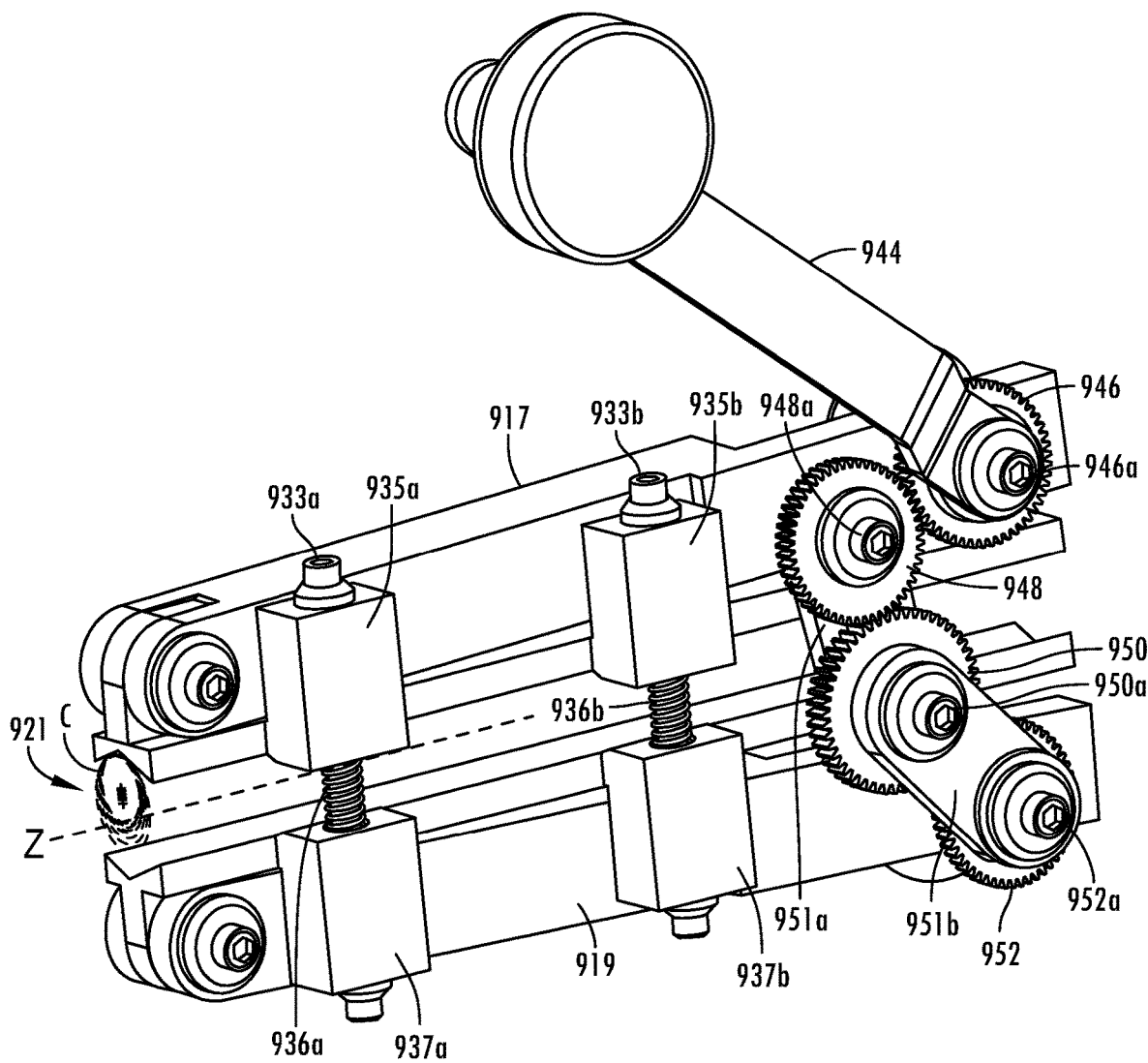
FIG. 19 is a back side view of the hand tool shown in FIG. 17.

Referring now to FIGS. 17-19, an embodiment of the hand tool 810 shown in FIGS. 14-16 having a cable receiving handle comprising two channel members is shown, and described as hand tool 910. Hand tool 910 comprises additional features beyond the simplified aspect shown in FIGS. 14-16, and provides a non-limiting example of specific mechanics, fasteners and nature of attachment of components contemplated herein. Significantly, hand tool 910 further comprises first and second saw handles 917, 919 which are pivotally connected to channel members 914, 916 by pivot pins 918, 920, respectively. Blades 940, 942 are retained in a fixed position onto saw handles 917, 919, such that each of blades 940, 942 can be selectively advanced into the respective slots within channel members 914, 916 when advanced into a cutting position. Channel members 914, 916 and saw handles 917, 919 can be advanced along spring pins 933$a,b$ when a squeezing force is applied to the saw handles and against the spring bias to set the width of cable receiving channel 921 and securely retain an armored cable within the channel.

In this manner, and as described in reference to FIG. 14, hand tool 910 may be operated without independent blade adjustment, or cable positioning adjustment mechanisms, each of which may rely solely on the placement of a cable within the cable receiving channel 921, and gripping channel members 914, 916 (e.g., by one-hand gripping each of saw handles 917, 919) to compress the cable receiving channel 921 to a dimension suitable for cutting an armored cable having a width C. Channel members 914, 916 can further comprise any number of cable retaining mechanisms described herein (e.g., stops, ridges, notches, etc.) on its inner surface facing cable receiving channel 921 to prevent axial movement of the cable during cutting of the armored cable.

Referring now to FIG. 18, a side view of hand tool 910 shows blades 940, 942 in a non-cutting position, as biased away from both the cable receiving channel 921 and channel members 914, 916 by the action of a spring. Thus, it can be seen that the travel of channel members 914, 916 along spring pins 933a,b may be limited to a distance less than that for pivot arms 917, 919. In this manner, blades 940, 942 may be withdrawn from the cutting to a position further than a maximum width C of the cable receiving channel 921. In such instance, it is further contemplated that a housing may be provided covering blades 940, 942 while in the non-cutting position shown. In such aspects, the safety and durability of the hand tool 910 can be improved, without requiring additional manipulation or setting of the device for operation, as the saw blades may be automatically withdrawn into the housing upon releasing the squeezing force applied to the saw handles after cutting the armor layer has been completed.

Referring now to FIG. 19, the mechanics and drive mechanism of hand tool 910 is shown as comprising a series of four interlocking gears, as described above for FIGS. 14-16. In hand tool 910, gears 946, 948, and 952 are each fixed to one of saw handles 917, 919. Gear 950 is provided as a lone mobile gear. During compression of the saw handles 917, 919 toward one another, mobile gear 950 is positioned to accommodate the motion of saw handles 917, 919. As is shown, pivot plates 951a,b are provided having a fixed length so as to retain gear 950 in engagement with gears 948 and 952 at any point along the travel path of the saw handles 917, 919 provided by spring pins 933a,b from a non-cutting position to a cutting position.

Also shown in FIG. 19, each of gears 946, 948, 950, 952 is provided with gear shaft (946a, 848a, 950a, 952a) that each independently provide an axis of rotation for the respective gears. As discussed above, gear shafts 946a, 948a, and 952a remain in a fixed position relative to the saw handles 917, 919, while the axial position of gear shaft 950a is configured to be adjustable throughout the compression path provided by springs 936a,b. Spring blocks 935a,b are provided with separate attachments to each of saw handles 917 and channel member 914, to allow for a difference in the extension of each from a cutting position into a non-cutting position, allowing blade 940 fixed to saw handle 917 to be extended into a shielded position. Similarly, spring blocks 937a, b can provide independent stop points for saw handle 919 and channel member 916.

From the description provided above, it will be apparent that the armored cables applicable to the hand tools and methods described herein is not limited to any particular width and generally may be any, or any combination of widths, generally employed in electrical installations. For instance, in certain aspects, the armored cable width (or maximum cable receiving channel width, or width C) can be in a range from about 1 mm to about 100 mm, from about 2 mm to about 75 mm, from about 5 mm to about 75 mm, from about 10 mm to about 50 mm, or from about 10 mm to about 25 mm. Alternatively, the armored cable width (or maximum cable receiving channel width, or width C) can be at least about 1 mm, at least about 5 mm, at least about 10 mm, at least about 25 mm, at least about 50 mm, or at least about 100 mm. Similarly, the armored cables contemplated herein can comprise any number of conductors, and of any size. Commonly employed armored cables will be readily understood by those of skill in the art.

By the combination of elements shown and described herein, methods of cutting armored cables using the tools described herein will be apparent to those of ordinary skill in the art. In certain aspects, methods contemplated herein can comprise, consist of, or consist essentially of, positioning an armored cable within a cable receiving handle of any stripping tool described herein, applying a first force to the first channel member and a second force opposing the first force to the second channel members, such that the width defined by the distance between the first channel member the second channel member is substantially equal to a width of the armored cable, cutting the armor layer of the armored cable by rotating the first and second saw blade at a cutting depth within the cable receiving channel, releasing the squeezing force, and removing the armored cable from the cable receiving channel.

Positioning the armored cable within a cable receiving handle is not limited to any particular method, and generally can be any that aligns the armored cable in a cutting position within the cable receiving channel. In certain aspects, positioning the armored cable can simply comprise inserting an armored cable within the cable receiving channel and aligning the cable locations to be cut with the blade locations of the cable stripper. In certain aspects, the cable may be positioned with its axis aligned with the axis of the cable receiving channel. The uncut, or longer end of the armored cable may extend from either end of the cable receiving channel (or not extend beyond the length of the channel. In certain aspects the shorter end of the armored cable closest to the cable location to be cut, can be positioned to extend from the cutting end of the channel comprising the blades.

Similarly, applying the first force and second forces to set the width of the cable receiving channel can be conducted in any manner suitable according to the hand tools described herein. In certain aspects, a squeezing force (e.g., gripping force) may be applied directly to the first channel member and the second channel member, in an opposing fashion, by a single hand of the user. In such aspects, the force applied to each channel member can be sufficient to advance the inner surface of the first and second channel members against the armor layer of the armored cable, such that the width defined by the distance between the first channel member the second channel member is substantially equal to a width of the armored cable.

Alternatively, the first and second opposing forces described herein may be applied to ancillary features of the hand tool connected with the first and second channel members. For instance in certain embodiments, applying a first and second force can comprise applying a first force to a first saw handle pivotally connected to the first channel, thereby pivoting the first saw handle into a fixed contacting position relative to the first channel member and advancing the first saw blade into the cable receiving channel through a slot in the first channel member. Such methods are contemplated by the use of hand tool 910, and can further comprise applying a second force to a second saw handle pivotally connected to the second channel member, thereby pivoting the second saw handle into a fixed contacting position relative to the second channel member and advancing the second saw blade into the cable receiving channel through a slot in the second channel member, the second force opposing the first force. As above, the combined first and second forces can be sufficient to further advance at least one of the first and second channel members toward the other of the first and second channel members to define a channel width substantially similar to the width of the armored cable (e.g., the combined width of the armored cable and the depth of the blade within the cable receiving channel), and further to restrict axial movement of the armored cable during the cutting step.

Variations of the cutting step contemplated herein will be apparent to those of ordinary skill in the art, and by reference to the various features of hand tools described herein. For instance, where a manual crank arm is present in the hand tool, cutting the armored layer of the armored cable can comprise manually turning the crank arm until the saw blades have advanced through the armor layer to the desired depth, or partially to the desired depth. Any number of blade rotations required to complete the desired cuts are contemplated herein. Cutting can comprise forward operation of the blades, as well as reverse operation to clear any burrs created during the cutting and assist in clearance of the cut armored cable from the cable receiving channel once the squeezing force is released.

Given the nature of the blade depth, universal channel width, and automatically resetting features described herein, it is further contemplated that the stripping tools described herein can advantageously be employed to cut several armored cables in succession, even of varying width without requiring resetting of the blade depth, cable stops, cable depth adjustments, or channel width from a receiving to a cutting position. Thus, methods contemplated herein may be conducted by one-handed operation of the hand tool, where the user may make use of their other hand to manipulate the armored cable to be cut. For instance, methods contemplated herein can further comprise positioning the cable with a first hand, applying a force with a second hand to secure the position, cutting the cable by operating the drive mechanism with the first hand, releasing the force applied by the second hand, and removing the armored cable with the first hand.

It follows that, without setting the hand tool out of the user's first hand, a second armored cable to be cut can be positioned within the cable receiving channel and the process repeated, irrespective of whether the width of the cable is the same as or different from the first armored cable. In this manner, hand tools described herein therefore may be operated successively, without interruptions caused by conventional stripping tools such as for resetting blade depths, cable positioning guides, and the width of the cable receiving channel to receive a second armored cable for cutting.

As a non-limiting example, the hand tools described herein can be used to successively cut the armor layer of a first armored cable containing two 14-gauge aluminum conductors and a 16 gauge ground wire, and/or having an overall diameter in a range from 5 to 15 mm (e.g., 12 mm), and the armor layer of a second armored cable containing four 4-gauge copper conductors and a 16 gauge ground wire, and or having an overall diameter in a range from 20 mm to 50 mm (e.g., 30 mm). Similarly, the material of the armor layer suitable to be cut by the stripping tools disclosed herein is not limited to any particular material, and can include steel, aluminum, and plastics. Alternative materials commonly employed as armored layers in armored cable are also contemplated herein.

As a person skilled in the art will readily appreciate, the above description is meant as an illustration of at least one implementation of the principles of the present invention. This description is not intended to limit the scope or application of this invention since the invention is susceptible to modification, variation and change without departing from the spirit of this invention, as defined in the following claims. The terminology used herein is therefore intended to be understood in the nature of words of description and not of limitation.

I claim:

1. A stripping tool for cutting an armored cable, the stripping tool comprising:
    a cable receiving handle comprising first and second channel members defining a cable receiving channel, the cable receiving channel having a channel width defined by a distance between the first channel member and the second channel member; and
    a saw assembly comprising:
        a first saw handle pivotally mounted to the first channel member at a first pivot point;
        a second saw handle pivotally mounted to the second channel member at a second pivot point;
        a first saw blade retained in a fixed first blade position onto the first saw handle;
        a second saw blade retained in a fixed second blade position onto the second saw handle; and
        a drive mechanism coupled to the first and second saw blades for rotatably driving the first and second saw blades;
    wherein:
    the channel width is adjustable between a maximum width and one of a plurality of cutting positions by applying a squeezing force to the first and second channel members;
    the first channel member and the second channel member are each slidably connected to each other by a pair of spring pins, each spring pin comprising a spring to bias the first channel member away from the second channel member to the maximum channel width; and
    the first saw handle and the second saw handle are each slidably connected to the pair of spring pins to bias the first saw handle and the second saw handle beyond the first channel member and the second channel member until the first saw blade and the second saw blade are outside the cable receiving channel.

2. The stripping tool according to claim 1, wherein the fixed first blade position is opposed to the fixed second blade position.

3. The stripping tool according to claim 1, wherein the drive mechanism comprises a series of gears coupled to the first and second saw blades.

4. The stripping tool of claim 3, wherein the series of gears is an even number of interconnected gears in a planar alignment, such that the first and second saw blades rotate in the opposite direction with respect to an axis of the cable receiving channel.

5. The stripping tool of claim 3, wherein the series of gears comprises a gear having a mobile axis of rotation.

6. The stripping tool according to claim 1, wherein the drive mechanism comprises a manually rotatable crank arm.

7. The stripping tool according to claim 1, wherein:
    each of the first and second pivot points is located at a first end of the cable receiving handle;
    each of the fixed first and second blade positions is located at a second end of the cable receiving handle; and
    each of the fixed first and second blade positions is stationary relative to the first and second saw handles, and mobile relative to the cable receiving handle.

8. A method for cutting the armored cable, the method comprising:
    positioning the armored cable within the cable receiving handle of the stripping tool of claim 1;

applying the squeezing force comprising a first force to the first channel member and a second force opposing the first force to the second channel members, such that the channel width defined by the distance between the first channel member the second channel member is equal to a width of the armored cable;

cutting an armor layer of the armored cable by rotating the first and second saw blade at a cutting depth within the cable receiving channel;

releasing the squeezing force; and removing the armored cable from the cable receiving channel.

9. The method of claim 8, wherein applying the squeezing force to the first and second channel members comprises:

applying the first force to the first saw handle pivotally connected to the first channel member, thereby pivoting the first saw handle into a fixed contacting position relative to the first channel member and advancing the first saw blade into the cable receiving channel through a slot in the first channel member;

applying the second force to the second saw handle pivotally connected to the second channel member, thereby pivoting the second saw handle into a fixed contacting position relative to the second channel member and advancing the second saw blade into the cable receiving channel through a slot in the second channel member, the second force opposing the first force;

the combined first and second forces further advancing at least one of the first and second channel members toward the other of the first and second channel members.

10. The method of claim 8, wherein the squeezing force restricts axial movement of the armored cable during a cutting step.

* * * * *